(12) United States Patent
Evans

(10) Patent No.: US 9,669,891 B2
(45) Date of Patent: Jun. 6, 2017

(54) BICYCLE FOR CHILDREN

(71) Applicant: Simon Peter Evans, Dublin (IE)

(72) Inventor: Simon Peter Evans, Dublin (IE)

( * ) Notice: Subject to any disclaimer, the term of this patent is extended or adjusted under 35 U.S.C. 154(b) by 0 days.

(21) Appl. No.: 14/772,689

(22) PCT Filed: Mar. 5, 2014

(86) PCT No.: PCT/EP2014/054244
§ 371 (c)(1),
(2) Date: Sep. 3, 2015

(87) PCT Pub. No.: WO2014/135579
PCT Pub. Date: Sep. 12, 2014

(65) Prior Publication Data
US 2016/0001843 A1    Jan. 7, 2016

(30) Foreign Application Priority Data
Mar. 5, 2013  (GB) .................................. 1303921.9

(51) Int. Cl.
*B62K 13/08*    (2006.01)
*B62K 9/00*    (2006.01)
(Continued)

(52) U.S. Cl.
CPC .............. *B62K 13/08* (2013.01); *B62K 9/00* (2013.01); *B62K 13/00* (2013.01); *B62M 1/36* (2013.01)

(58) Field of Classification Search
CPC .......... B62K 13/08; B62K 9/00; B62K 13/00; B62K 17/00; B62K 15/00;
(Continued)

(56) References Cited

U.S. PATENT DOCUMENTS 5,072,961 A * 12/1991 Huppe .................. B62K 13/08
280/276
7,798,513 B1 * 9/2010 Salvant .................... B62H 7/00
280/259

(Continued)

FOREIGN PATENT DOCUMENTS

CH        702538 A2    7/2011
DE       1772869 U     8/1968
(Continued)

OTHER PUBLICATIONS

International Search Report issued in related application Serial No. PCT/EP2014/054244 on Apr. 10, 2014.

*Primary Examiner* — Brian Swenson
(74) *Attorney, Agent, or Firm* — Brian J. Colandreo; Michael T. Abramson; Holland & Knight LLP

(57) ABSTRACT

A bicycle (1,51,61,81,91) for children that can "grow" with the child. The bicycle comprises a frame (3,53,63,83,93) having a seat-tube (5). The frame has a front wheel (11), a rear wheel (13), a pair of handlebars (19), and a saddle (15) having a seat-post (17) for insertion into the seat-tube. The bicycle comprises a detachably mounted drivetrain (27) for releasable engagement of the frame to allow conversion of the bicycle to a balance bicycle or a pedal bicycle. Furthermore, the bicycle frame itself is height-adjustable to allow adjustment of the seat tube's (5) height above ground and reach-adjustable to allow adjustment of the distance between the saddle (15) and the handlebars (19). By providing such a bicycle, the bicycle will be convertible from a balance bicycle to a pedal bicycle and will also have a frame that is adjustable in height and reach. This bicycle will be suitable for a wide range of child heights and cycling abilities.

14 Claims, 20 Drawing Sheets

(51) Int. Cl.
*B62K 13/00* (2006.01)
*B62M 1/36* (2013.01)

(58) Field of Classification Search
CPC .... B62K 2015/003; B62K 19/00; B62K 3/02; B62M 1/36; B62H 7/00
See application file for complete search history.

(56) References Cited

U.S. PATENT DOCUMENTS

| | | | | |
|---|---|---|---|---|
| 8,191,931 | B1* | 6/2012 | Mulder | B62K 9/00 280/828 |
| 8,286,974 | B2* | 10/2012 | Chen | B62K 9/00 280/1.188 |
| 8,464,609 | B2* | 6/2013 | Shiu | B62K 13/00 280/278 |
| 2004/0070165 | A1* | 4/2004 | Liebetrau | B62K 9/00 280/259 |
| 2004/0201199 | A1* | 10/2004 | Liebetrau | B62H 7/00 280/278 |
| 2007/0238585 | A1* | 10/2007 | Mondello | A63B 69/16 482/57 |
| 2014/0077470 | A1* | 3/2014 | Chen | B62K 9/00 280/87.05 |
| 2015/0035248 | A1* | 2/2015 | Baron | B62K 9/00 280/259 |

FOREIGN PATENT DOCUMENTS

| | | |
|---|---|---|
| DE | 20217351 U1 | 3/2003 |
| FR | 607010 A | 6/1926 |

* cited by examiner

BICYCLE FOR CHILDREN

CROSS-REFERENCE TO RELATED APPLICATIONS

The subject application is a U.S. National Stage application of International Application No. PCT/EP2014/054244, filed on Mar. 5, 2014, which claims the priority of Great Britain Patent Application No. 1303921.9, filed Mar. 5, 2013. The contents of both applications are herein incorporated by reference in their entirety.

TECHNICAL FIELD

This invention relates to a bicycle for children. More specifically, this invention relates to a bicycle for children that will "grow" with the child.

BACKGROUND ART

Generally speaking, children's bicycles are immensely popular with children and parents alike. Learning to ride a bicycle provides the children with a great sense of achievement and often their first taste of independence from their parents. The parents will in turn derive great joy from the happiness of their offspring caused by this sense of achievement and independence. Furthermore, the parents will derive satisfaction from the knowledge that their child is partaking in a healthy activity.

Heretofore, one of the most common methods of teaching a child to ride a bicycle was to fit the bicycle with stabilisers that prevent the bicycle from falling over to one side or the other. The stabilisers allow the child to learn and get comfortable with the riding fundamentals of steering, braking and pedalling before tackling the skill of balancing on only two wheels. In many ways, the stabilisers offered a logical transition to a bicycle from a tricycle. One of the main advantages of using stabilisers was that once the child had mastered the skills of steering, braking and pedalling and was sufficiently confident to learn how to balance on two wheels, the stabilisers could be removed from the bicycle with relative ease and an entirely new bicycle without stabilisers did not have to be purchased.

Another method of teaching a child to ride a bicycle that has been growing in popularity in recent times is to provide a so-called balance bicycle to the child. A balance bicycle is similar to a normal bicycle but without a drivetrain including pedals. Instead of pedalling, the child effectively pushes the bicycle along using their feet pushing against the ground. Stabilisers are not provided on the balance bicycle and therefore instead of learning the skills of steering, braking and pedalling initially and subsequently learning the skill of balancing, the child learns the skills of steering, braking and balancing initially and when they are sufficiently comfortable with those skills, they are ready to graduate to a bicycle with pedals on which they can learn the additional skill of pedalling. Many experts believe that the balance bicycle methodology is more effective for children learning to ride a bicycle than the stabiliser methodology.

There are however problems with the known bicycles for children. In relation to balance bicycles, a major shortcoming of these bicycles is that once the child has learnt the skills of balancing, steering and braking, an entirely new bicycle with pedals must be purchased in order to allow the child progress to the next stage. Obviously, this is expensive and undesirable. It is not uncommon for a child to quickly master the balance bicycle and be ready to progress to a pedal bicycle resulting in a balance bicycle that is only used for a relatively short period of time and therefore appears to offer poor value for money. These are significant barriers to implementing what many experts believe to be the easier way to teach children how to ride a bicycle.

In relation to both balance bicycles and pedal bicycles for children, when learning to ride a bicycle, the children are at a developmental stage of typically rapid growth and they often outgrow the bicycle in a relatively short period of time. The bicycles often cater for a limited degree of adjustment by allowing one or both of the saddle and the handlebars to be height-adjustable to suit the height of the child. As the child grows, the height of the saddle and the handlebars can be adjusted accordingly to best suit the rider's height. However, this offers relatively limited adjustment of the bicycle for the child and the bicycles purchased at this stage of their development seldom last for more than two years before the child has outgrown the bicycle.

It is an object of the present invention to provide a bicycle for a child that overcomes at least some of these problems and offers a useful choice to the consumer. In particular, it is an object of the present invention to provide a bicycle for a child that will be able to "grow" with the child during this stage of the child's rapid physical development and that will enable the child to learn how to ride a bicycle in a preferred manner without necessitating the purchase of numerous disparate bicycles.

SUMMARY OF INVENTION

According to the invention there is provided a bicycle comprising a frame having a seat-tube, the frame having mounted thereon a front wheel, a rear wheel, a pair of handlebars coupled to the front wheel through a front fork, and a saddle having a seat-post for insertion into the seat-tube, and in which there is provided a detachably mounted drivetrain for releasable engagement of the frame to allow conversion of the bike to and from a balance bicycle and a pedal bicycle, and in which the bicycle frame itself is configurable to provide a frame that is height-adjustable to allow alteration of the height of the seat tube above the ground and reach adjustable to allow alteration of the distance between the saddle and the handlebars.

By having such a bicycle, the same bicycle will potentially last for several years as it can be adjusted to suit the child's needs at a given stage of their development. Such a bicycle will enable the child to learn how to ride the bicycle as a balance bicycle and then when they are ready to progress to a bicycle with pedals, the drivetrain including pedals can be fitted to the same bicycle thereby obviating the need for an entirely new bicycle to be bought. Importantly, as the child grows, the bicycle frame itself and not simply the saddle and handlebars will be height and reach adjustable to provide the maximum amount of adjustment to the fit of the bicycle ensuring that the bicycle frame can be adjusted to suit the height and reach of the child and will last far longer than was heretofore the case. The bicycle can transition from a balance bicycle to a taller balance bicycle and thereafter to a tall pedal bicycle to suit the needs of the child. Furthermore, as the frame is height and reach adjustable, the child can take as much time as they need with the balance bike before they are comfortable transitioning to a pedal bicycle.

In one embodiment of the invention there is provided a bicycle in which the frame comprises a two part frame, a first part and a second part, and in which the second part is adjustably mounted on the first part to allow alteration of the height of the seat tube above the ground and the reach distance from the saddle to the handlebars. This is seen as a very effectively way of providing an adjustable frame for the child.

In one embodiment of the invention there is provided a bicycle in which the first part comprises a front frame part having a head tube and the second part comprises a rear frame part having a pair of chainstays, and in which the rear frame part is rotatable relative to the front frame part. This is seen as a particularly preferred way of adjusting the height and reach of the frame that will be simple and quick to modify.

In one embodiment of the invention there is provided a bicycle in which one of the front and rear frame parts is provided with an internal bore and the other of the front and rear frame parts is provided with an axial extension for insertion into the internal bore of the other frame part.

In one embodiment of the invention there is provided a bicycle in which the internal bore and the axial extension are dimensioned to prevent rotation of the axial extension when it is housed in the internal bore. This is seen as particularly useful as a secure engagement between the front and rear frame parts will be achieved preventing relative movement of the parts when the axial extension is fully inserted into the internal bore.

In one embodiment of the invention there is provided a bicycle in which the first part comprises a front frame part having a head tube and the second part comprises a rear frame part having a pair of chainstays, and in which the rear frame part is pivotably mounted on the front frame part. This is seen as a useful alternative way of providing a height and reach adjustable frame that will not require removal of wheels, drivetrains or braking equipment from the bicycle.

In one embodiment of the invention there is provided a bicycle in which the first part comprises a head tube at a front end thereof and extends rearwardly therefrom into a pair of chainstays, and in which the second part comprises a seat-tube mounted on a bracket which is detachably mounted on the first part in any one of a plurality of mounting points on the first part. This is seen as another useful alternative way of providing a height and reach adjustable frame that will not require the removal of wheels, drivetrains or braking equipment in order to adjust the height and reach of the bicycle.

In one embodiment of the invention there is provided a bicycle in which the frame is cranked intermediate its ends and is reversible so that it may be flipped about its main longitudinal axis. This is seen as a further still useful alternative way of providing a frame that is height and reach adjustable.

In one embodiment of the invention there is provided a bicycle in which the frame is arcuate in shape.

In one embodiment of the invention there is provided a bicycle in which the forks and the handlebars are detachably mounted to the frame and their positions are interchangeable on the frame.

In one embodiment of the invention there is provided a bicycle in which the pair of forks are connected to the handlebars by way of a stem which passes through a head tube on the frame, and in which one of the handlebars and the pair of forks are detachably mounted to the stem to allow removal of the stem from the head tube and reversal of the positions of the handlebars and the forks relative to the frame.

In one embodiment of the invention there is provided a bicycle in which the forks are connected to the handlebars by way of a stem which passes through a head tube on the frame, and in which the head tube is rotatably mounted on the frame.

In one embodiment of the invention there is provided a bicycle in which there is provided a seat tube that extends upwardly from the frame and a seat tube that extends downwardly from the frame. By providing a seat tube that extends upwardly from the frame and a seat tube that extends downwardly from the frame, the frame or at least a part thereof will be reversible to provide height adjustment and furthermore, the downwardly depending seat tube can be used to mount the drivetrain if needed.

In one embodiment of the invention there is provided a bicycle in which the seat tube is a single continuous seat tube that extends both upwardly and downwardly from the frame. This is seen as a simple construction to manufacture.

In one embodiment of the invention there is provided a bicycle in which the drivetrain is provided with a mounting stub dimensioned to be inserted in a downwardly depending seat tube.

BRIEF DESCRIPTION OF THE DRAWINGS

The invention will now be more clearly understood from the following description of some embodiments thereof given by way of example only with reference to the accompanying drawings, in which.

DETAILED DESCRIPTION OF THE DRAWINGS

Figure 1A:
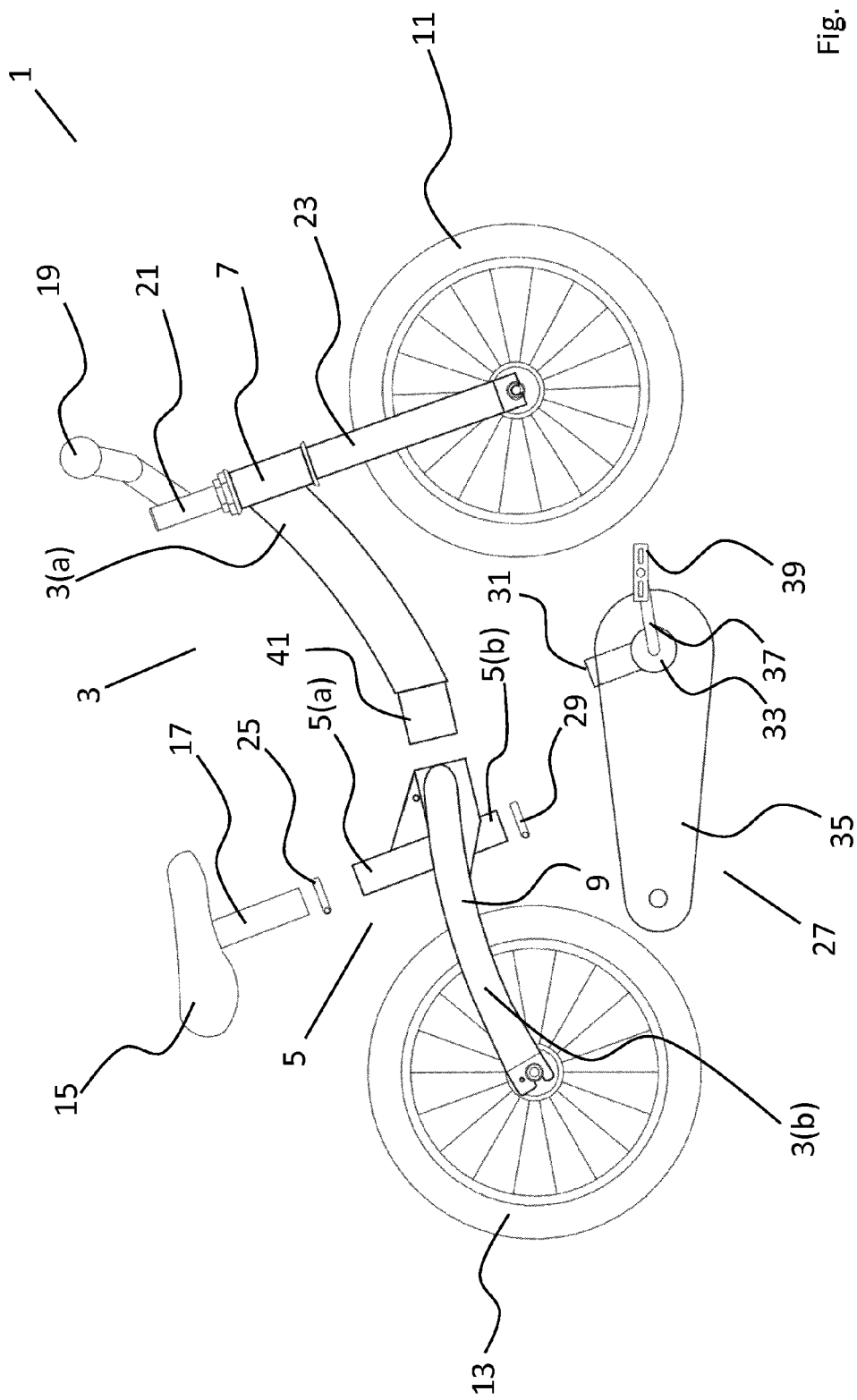
FIG. 1(a) is an exploded view of a first embodiment of bicycle according to the invention.

Referring to FIGS. 1(a) to 1(d) inclusive, there is shown a bicycle for children, indicated generally by the reference numeral 1, comprising a frame 3 having a seat tube 5, a head tube 7 and a pair of chain stays 9, only one of which is shown. The frame 3 carries a front wheel 11, a rear wheel 13, a saddle 15 having a seat post 17 for insertion into the seat tube 5, and a pair of handlebars 19 coupled to the front wheel 11 by way of a stem 21 and forks 23. There is additionally provided a seat clamp 25 for securing the seat post 17 in position in the seat tube 5. Together, the above components comprise the necessary components of a balance bicycle.

The seat tube 5 comprises a first part 5(a) that is upwardly extending and a second part 5(b) that is downwardly depending. The seat post 17 is inserted into the upwardly extending part 5(a) and secured in place in the upwardly extending part 5(a) by the seat clamp 25. In addition to the components of the balance bicycle, there is provided a drive train 27 and a clamp 29 for securing the drive train 27 in position in the downwardly depending part 5(b) of the seat tube 5. The drivetrain 27 comprises a mounting stub 31 dimensioned to be inserted in the downwardly depending part 5(b) of the seat tube 5. Otherwise, the drivetrain 27 comprises standard drivetrain components well known in the art including, but not limited to, a bottom bracket, a bottom bracket shell 33, a chainring, a sprocket, a chain led over the chain ring and the sprocket, a chain guard 35, a pair of cranks 37 (only one of which is shown) and a pair of pedals 39 (only one of which is shown), one at the outermost end of each of the cranks 37.

Referring specifically to FIG. 1(a), it can be seen that the frame 3 is a two part frame, comprising a front frame part 3(a) having the head tube and a rear frame part 3(b) having the pair of chainstays 9. In the embodiment shown, the rear frame part 3(b) has an internal bore (not shown) and the front frame part 3(a) has an axial extension 41 for insertion into the internal bore of the rear frame part 3(b). There is provided means (not shown) for securing the front frame part 3(a) and the rear frame part 3(b) together. In one embodiment, the two parts of the frame are secured in a similar manner to the seatpost and the seat tube. The internal bore has a small split partway along its length, and the small triangular gusset between the internal bore and upwardly extending seatpost/seattube has means for locating a bolt through it. When the bolt is tightened, the split in the internal bore tightens around the axial extending part, thus providing a secure fixing. The axial extension 41 of the front frame part 3(a) and the internal bore of the rear frame part 3(b) may be circular or they may be dimensioned to prevent rotation of the frame parts relative to each other when the axial extension is inserted into the bore. For example, both the axial extension and the internal bore may be elliptical, square, rectangular, hexagonal, octagonal or like shape in cross section and form a close fit with each other to prevent rotation of the front frame part 3(a) relative to the rear frame part 3(b). It can be further seen that both the front frame section 3(a) and rear frame section 3(b) are arcuate in shape.

Figure 1B:
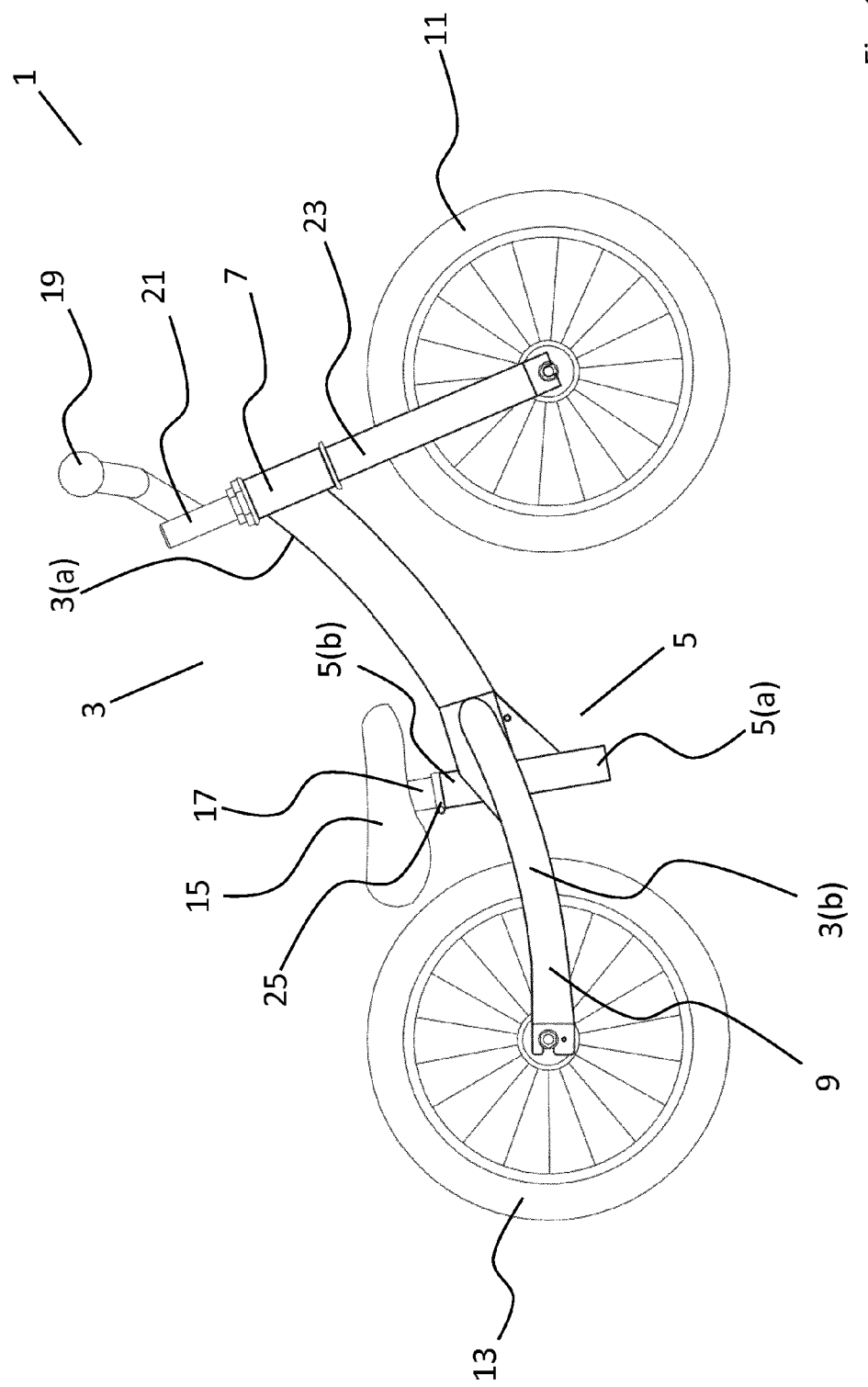
FIG. 1(b) is a side view of the bicycle shown in FIG. 1(a) in a lowered configuration without a drivetrain connected.

Referring specifically to FIG. 1(b), the bicycle for children is shown in a lowered, balance bicycle configuration without the drivetrain 27 attached to the frame 3. It can be seen that the rear frame section 3(b) has been rotated through 180° about a longitudinal axis compared to the configuration shown in FIG. 1(a) and the axial extension of the front frame part 3(a) has been inserted into the internal bore of the rear frame part 3(b).

The second part 5(b) of the seat tube 5 that was the downwardly depending part in FIG. 1(a) is now the upwardly extending part in FIG. 1(b) and the first part 5(a) of the seat tube 5 that was the upwardly extending part in FIG. 1(a) is now the downwardly depending part in FIG. 1(b). The seat post 17 is inserted into the second part 5(b) of the seat tube 5 that is upwardly extending and secured in place with the clamp 25. It can be seen that in this configuration, the uppermost point of the seat tube 5 is relatively close to the ground and the handlebars are relatively close to the saddle and therefore the bicycle in this configuration is suitable to relatively short children. If desired, if the child is ready for a pedal bicycle, a drivetrain may be mounted on the frame, as will be described in more detail below with reference to FIG. 1(d).

Figure 1C:
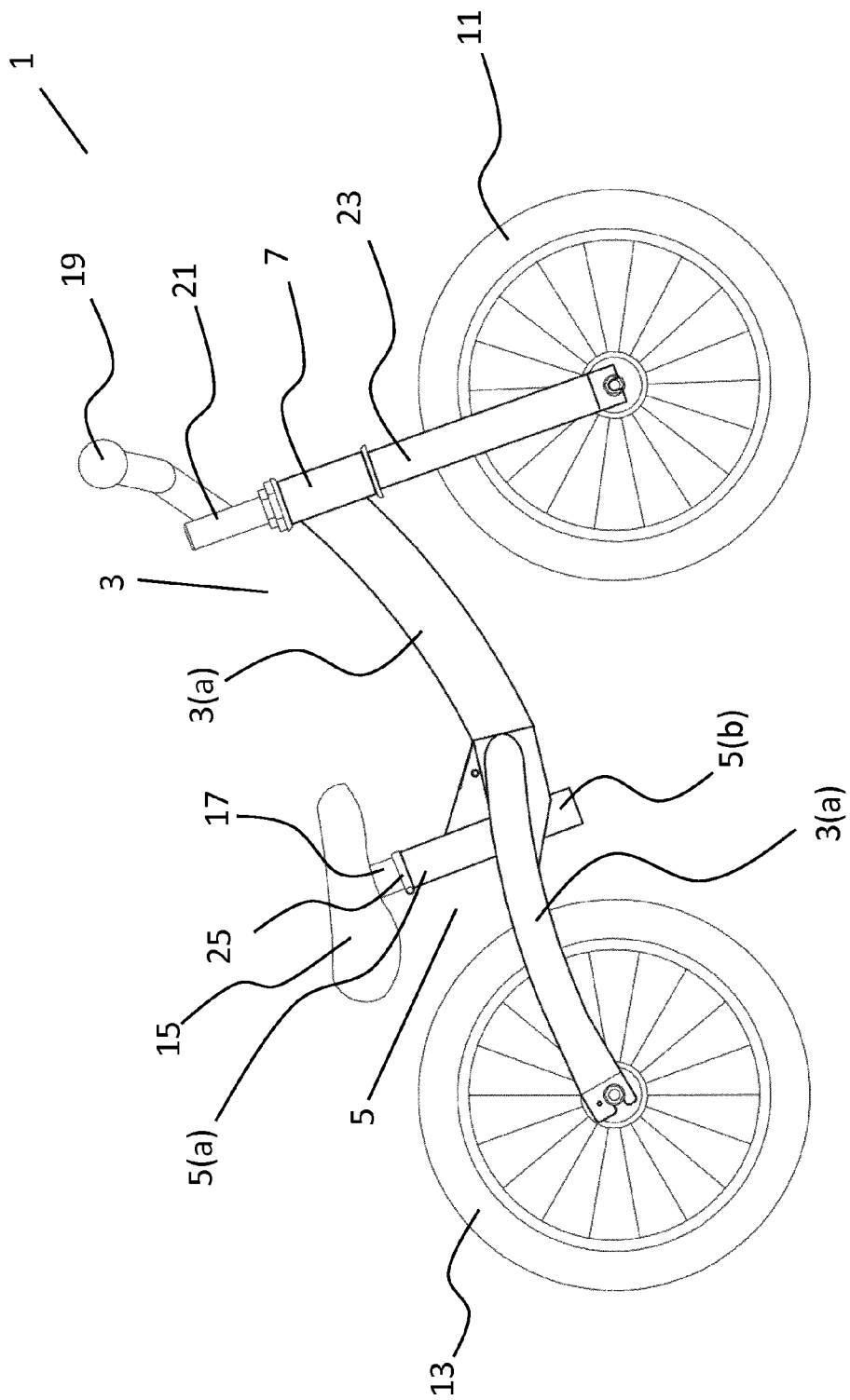
FIG. 1(c) is a side view of the bicycle shown in FIG. 1(a) in a raised configuration without a drivetrain connected.

Referring to FIG. 1(c), the bicycle is shown in a raised, balance bicycle configuration without the drivetrain 27 attached to the frame 3. As the child grows, they may require a taller bicycle frame even though they may not yet be ready for pedals. In order to achieve this, the frame of the balance bicycle may be raised compared to the configuration shown in FIG. 1(b) by: disconnecting the rear frame section 3(b) from the front frame section 3(a), rotating the rear frame section through 180° about its longitudinal axis, re-inserting the axial extension 41 on the front frame section 3(a) into the internal bore in the rear frame section 3(b) and securing the front frame section 3(a) to the rear frame section 3(b). If the axial extension and the internal bore are circular, it will be understood that the rear frame section will not have to be detached from the front frame section and the axial extension will not have to be removed from and then subsequently re-inserted into the internal bore. Instead, the means for securing the frame sections together can be temporarily released, the rear frame section can be rotated through 180° about its longitudinal axis and the two frame sections can be fastened together once more. In addition to rotating the rear frame section 3(b), the seat must also be repositioned. This is achieved by releasing the seat clamp 25 and removing the seat post 17 from the second part 5(b) of the seat tube before inserting the seat post 17 into the first part 5(a) of the seat tube and securing the seat in position with the seat clamp 25. It can be seen that in this configuration shown in FIG. 1(c), the uppermost point of the seat tube 5 has moved away from the ground and the saddle has moved away from the handlebars and therefore the bicycle in this configuration is suitable for relatively tall children.

Figure 1D:
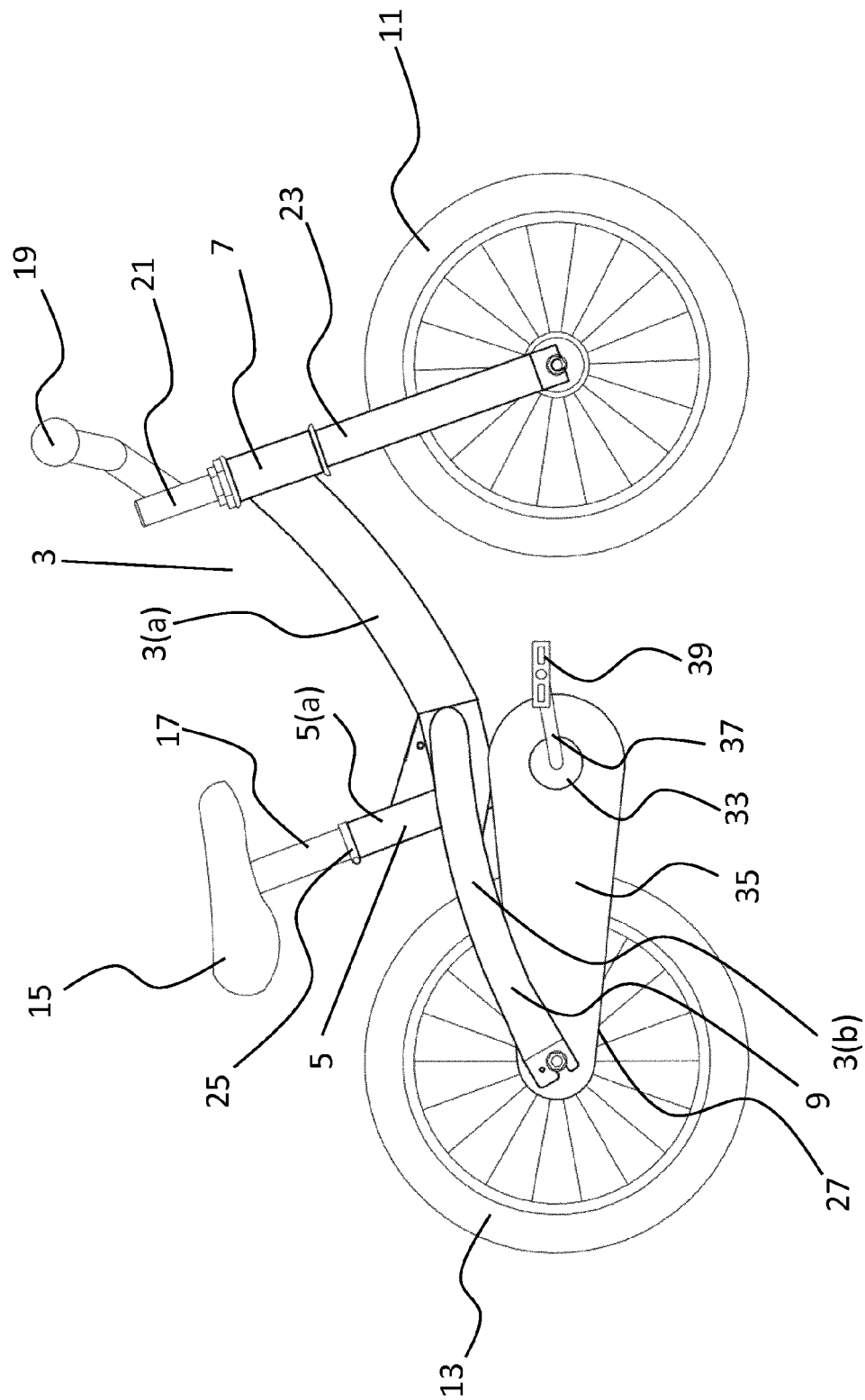
FIG. 1(d) is a side view of the bicycle shown in FIG. 1(a) in a raised configuration with a drivetrain connected.

Referring to FIG. 1(d), the bicycle is shown in a raised, pedal bicycle configuration with the drivetrain 27 attached to the frame 3. In order to attach the drivetrain 27 to the frame, the mounting stub 31 is inserted into the downwardly depending part 5(b) of the seat tube 5 and a sprocket (not shown) is connected to the wheel hub (not shown) so that the drive train is coupled to the rear wheel. In the embodiment shown in FIG. 1(d), the saddle 15 is shown in a raised configuration, thereby providing further height adjustment to the bicycle so that it can "grow" with the child.

Referring to FIGS. 2(a) to 2(d) inclusive, there is shown a plurality of views of a second embodiment of a bicycle for children, indicated generally by the reference numeral 51, where like parts have been given the same reference numeral as before. The bicycle 51 comprises a two part frame 53 consisting of a front frame part 53(a) and a rear frame part 53(b) pivotably mounted on the front frame part 53(a).

The front frame part 53(a) and the rear frame part 53(b) both comprise a pivoting aperture 55, 56 respectively through which a bolt (not shown) or other rod is inserted which will form a pivot point for the frame parts 53(a), 53(b) about which they may pivot. The front frame part 53(a) comprises an adjustment slot 57 for reception of a locking bolt (not shown) and the rear frame part 53(b) further comprises an adjustment aperture 59 through which the locking bolt (not shown) may be inserted.

The forwardmost part of the rear frame part 53(b) is preferably bifurcated with a pair of arms, each of which is provided with the pivoting aperture 56 and the adjustment aperture 59, one of the arms extends on either side of the rearwardmost part of the front frame part 53(a). In this way, a bolt may be inserted through the pivoting aperture 56 of one arm of the bifurcated forwardmost portion of the rear frame part 53(b), through the pivoting aperture 55 of the front frame part 53(a) and through the pivoting aperture 56 in the other arm of the bifurcated forwardmost portion of the rear frame part 53(b) before being secured in place with a locking nut (not shown). Alternatively, the rearwardmost part of the front frame part 53(a) may be bifurcated with a pair of arms, each of which is provided with the pivoting aperture 55 and the adjustment slot 57, one of which extends either side of the forwardmost part of the rear frame part 53(b). However, for the purposes of this example, the rear frame part 53(b) shall be bifurcated with the pair of arms.

A locking bolt is inserted through the adjustment aperture 59 in each of the arms and through the adjustment slot 57 therebetween. The rear frame part 53(b) is pivoted to the desired height in the direction of the arrow A. It will be understood that the degree of rotation will be limited by the length of the adjustment slot 57. Once the frame is at the desired height, a locking nut is tightened onto the end of the locking bolt and the front frames part 53(a) and the rear frame part 53(b) are held in a fixed relationship with each other. If the height of the frame is to be adjusted, the locking nut is temporarily loosened, the rear frame part 53(b) is pivoted to the desired position about the pivoting pin and relative to the front frame part 53(a), and the locking nut is tightened once more.

Figure 2A:
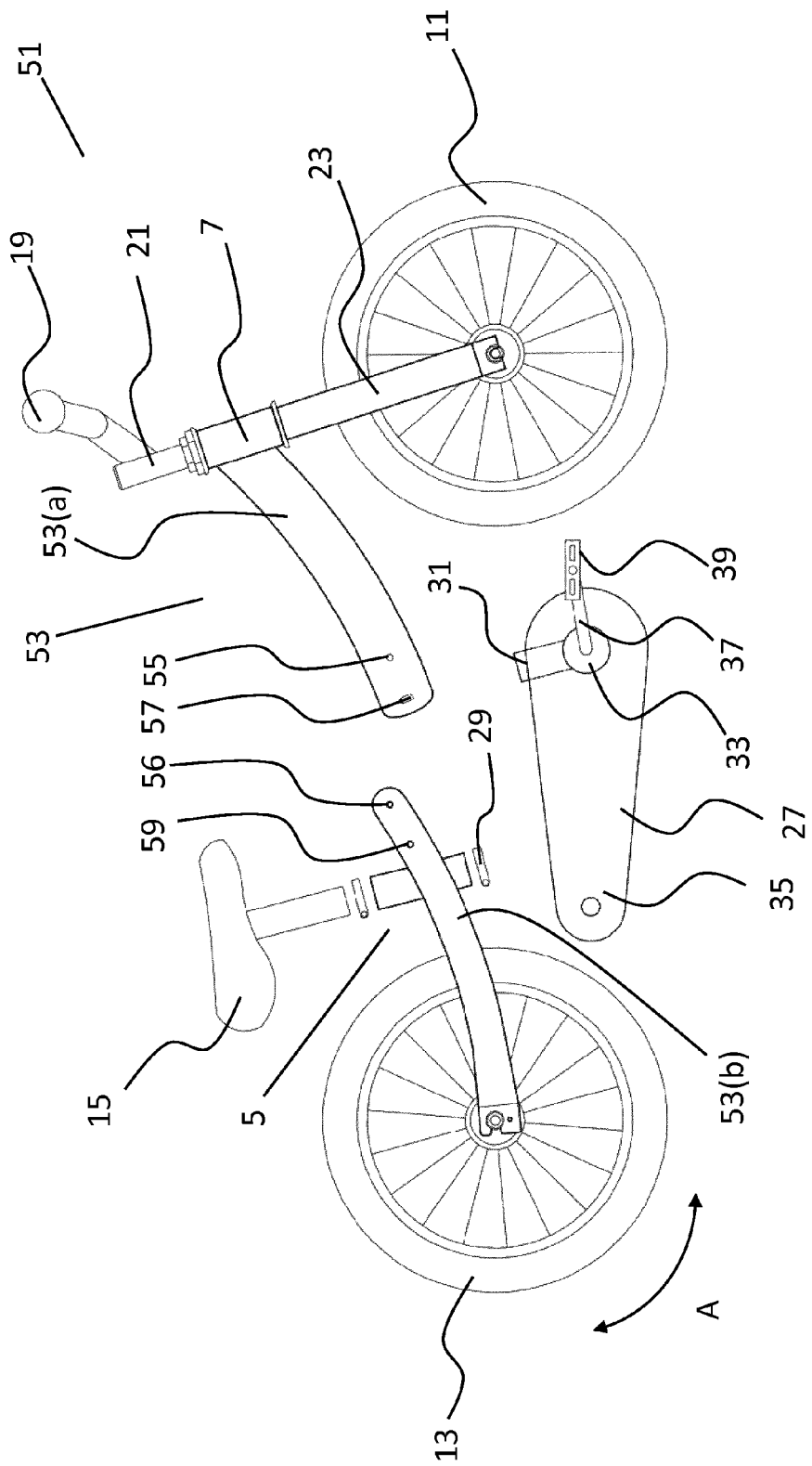
FIG. 2(a) is an exploded view of a second embodiment of bicycle according to the invention.
Figure 2B:
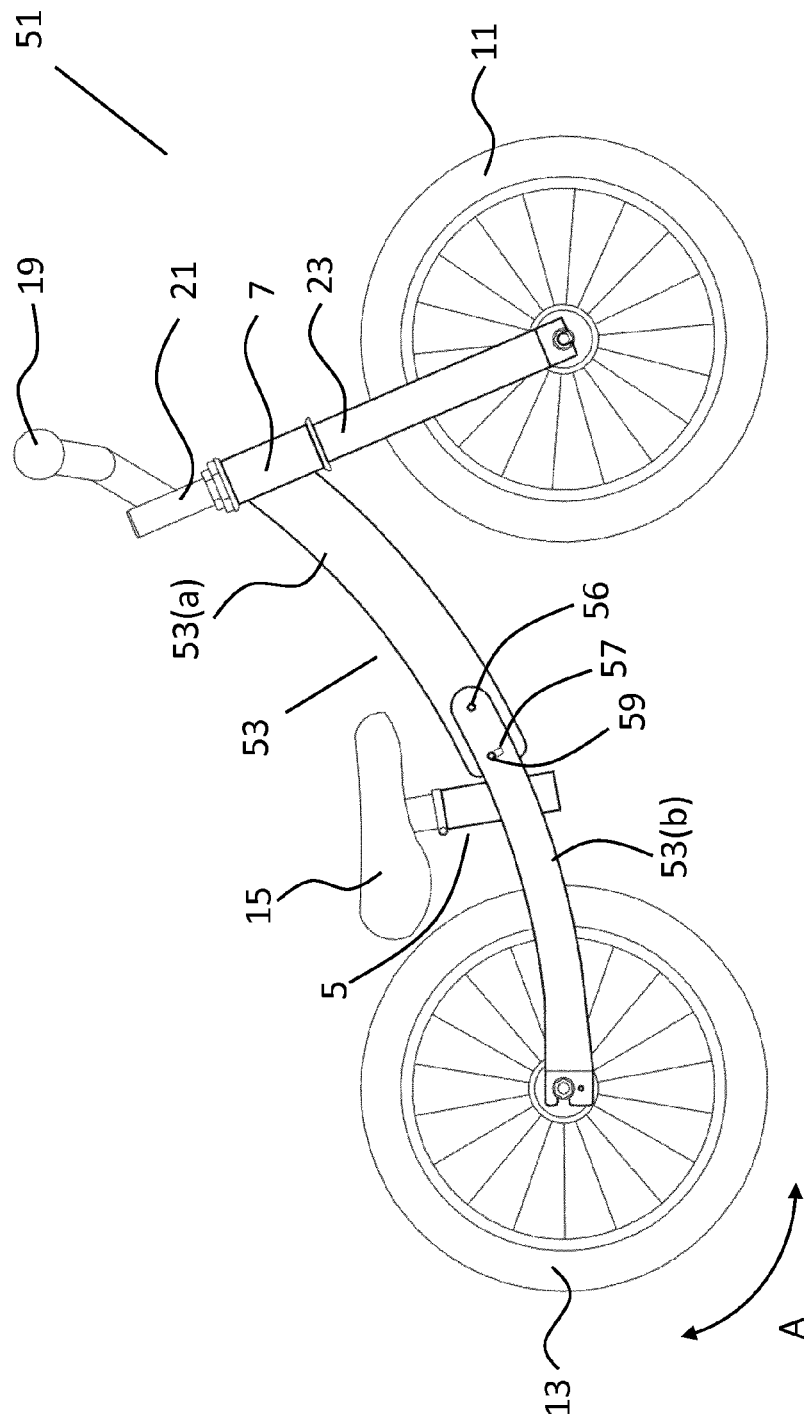
FIG. 2(b) is a side view of the bicycle shown in FIG. 2(a) in a lowered configuration without a drivetrain connected.
Figure 2C:
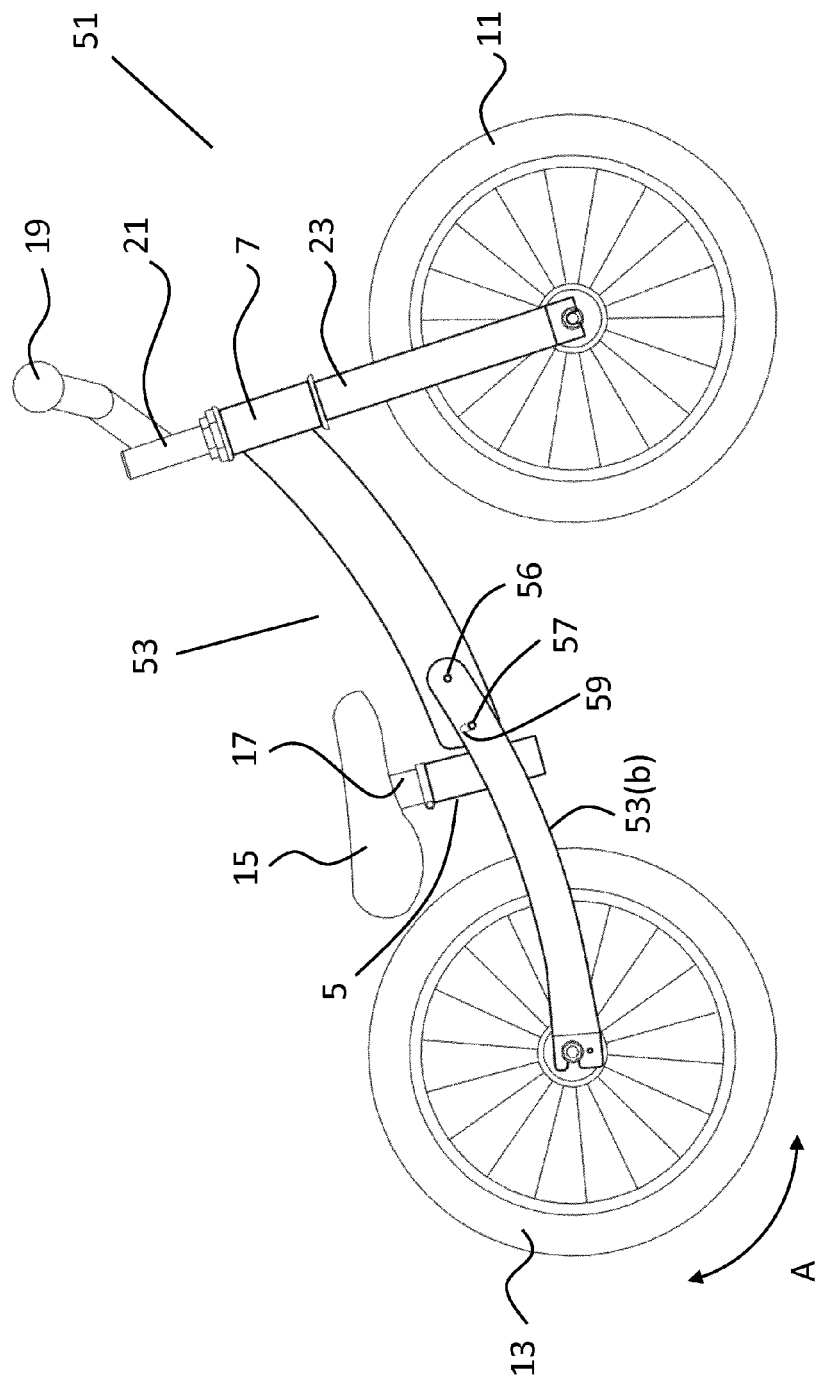
FIG. 2(c) is a side view of the bicycle shown in FIG. 2(a) in a raised configuration without a drivetrain connected.
Figure 2D:
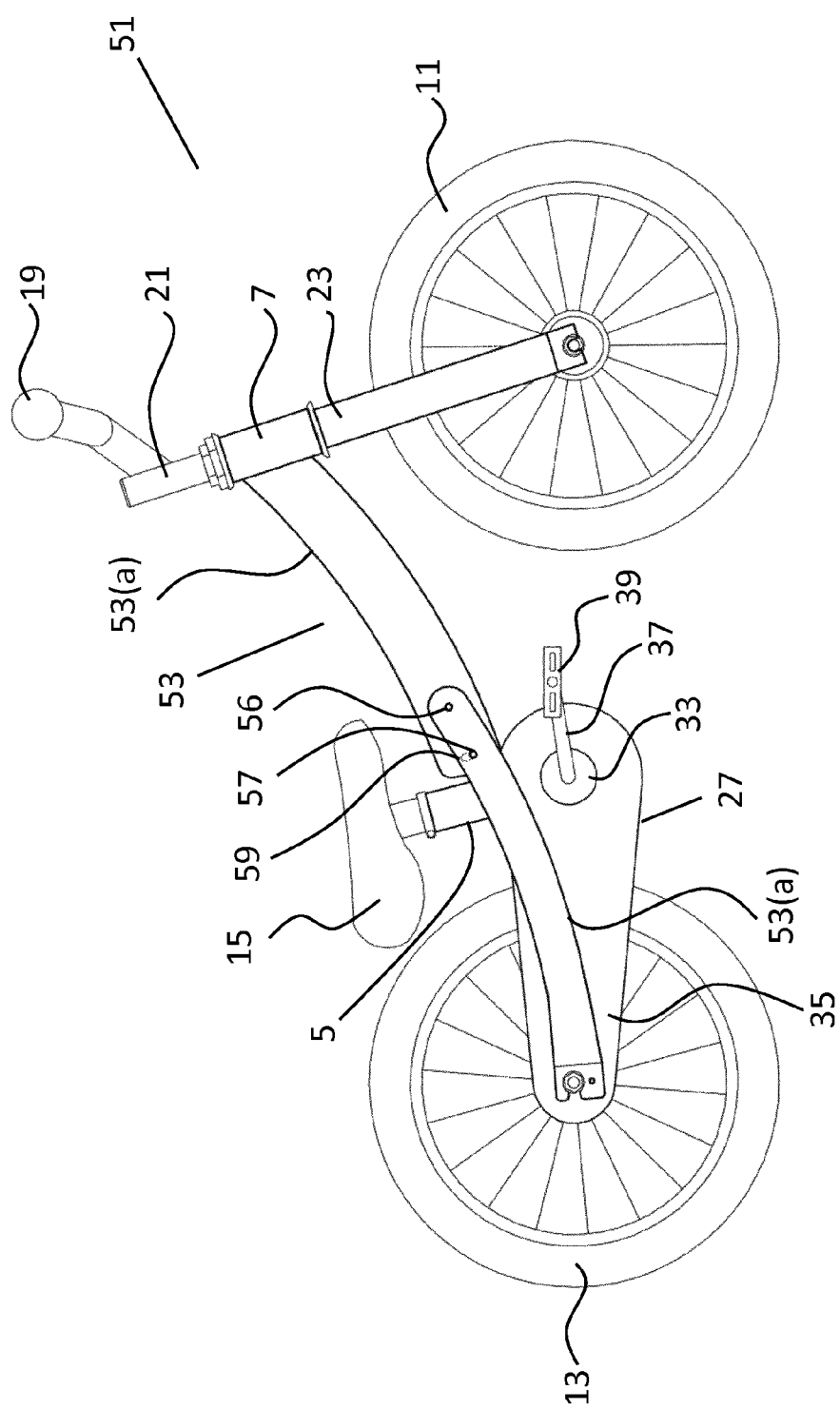
FIG. 2(d) is a side view of the bicycle shown in FIG. 2(a) in a raised configuration with a drivetrain connected.

Referring to FIG. 2(b), there is shown a side view of the bicycle in a lowered configuration without a drivetrain connected. In order to raise the bicycle frame, the locking nut on the locking bolt is eased and the rear frame part 53(b) is pivoted in an anticlockwise direction. Once the seat tube is at the desired height above the ground, the locking nut is tightened thereby retaining the front frame part and the rear frame part in a fixed relationship with respect to each other once more. Referring to FIG. 2(c), the bicycle is in a raised configuration without a drivetrain connected. In FIG. 2(d), the bicycle is in a raised configuration with the drivetrain 27 connected.

Referring to FIGS. 3(a) to 3(d) inclusive, there is shown a plurality of views of a third embodiment of a bicycle for children, indicated generally by the reference numeral 61, where like parts have been given the same reference numeral as before. The bicycle 61 comprises a two part frame 63 consisting of a main frame part 63(a) and an auxiliary frame part 63(b). The main frame part 63(a) carries the head tube 7, the chainstays 9, the front wheel 11, the rear wheel 13, the handlebars 19, the stem 21 and the forks 23. The main frame part has a plurality of sets of mounting points 65, 67 for the auxiliary frame thereon. The auxiliary frame part 63(b) comprises a seat-tube 5 mounted on a bracket 69 having mounting apertures 71, 73 therein. The auxiliary frame part 63(b) bracket 69 may be a bifurcated bracket with a pair of downwardly depending arms, one of which is mountable on either side of the main frame part 63(a). The auxiliary frame part 63(b) is detachably mounted on the main frame part in any one of the plurality of mounting points 65, 67 on the first part 63(a). Locking bolts and nuts (not shown) are provided for insertion through the mounting apertures 71, 73 in the auxiliary frame part's bracket 69 and through one of the sets of mounting points 65, 67 in the main frame part 63(a).

Figure 3A:
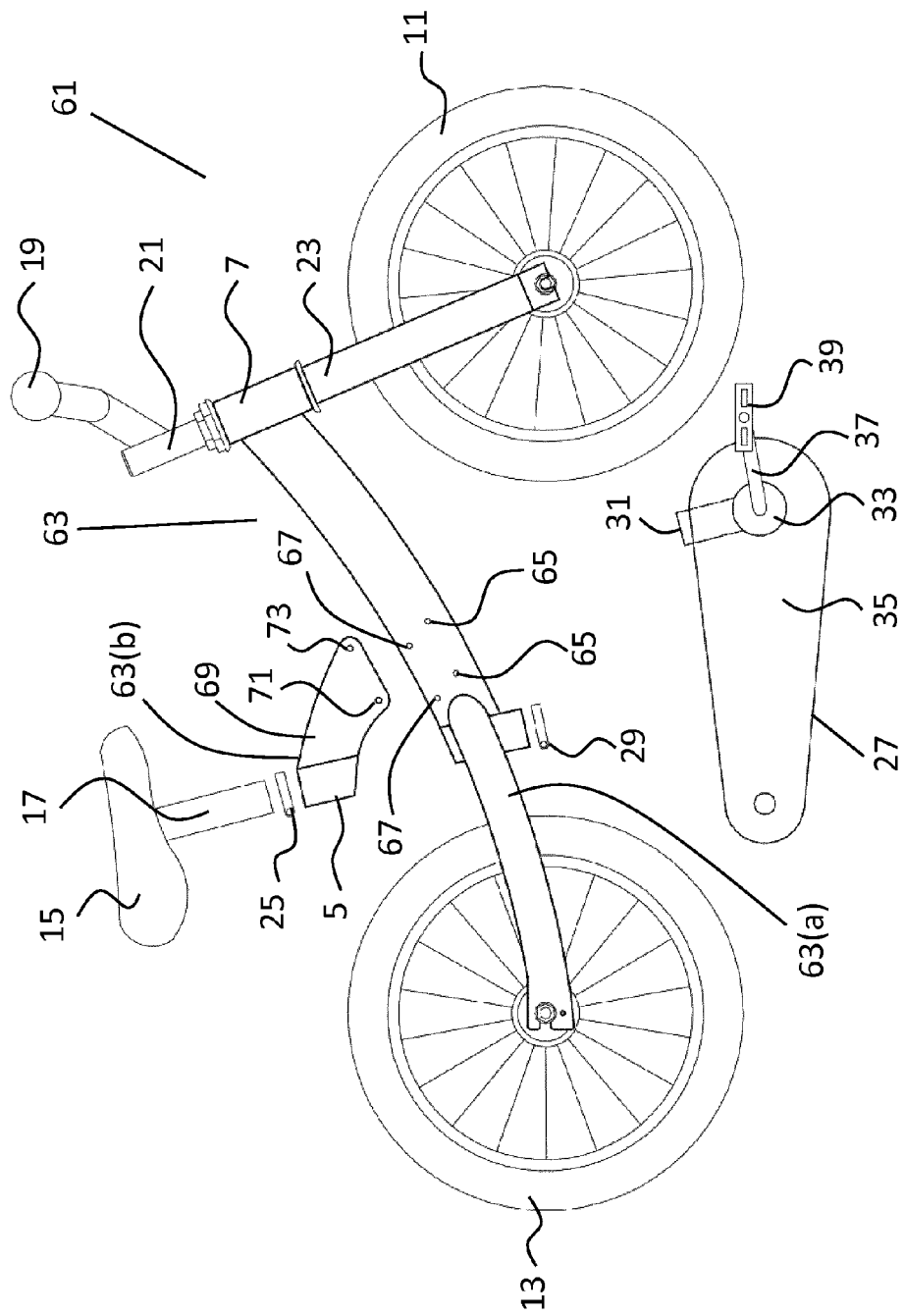
FIG. 3(a) is an exploded view of a third embodiment of bicycle according to the invention.
Figure 3B:
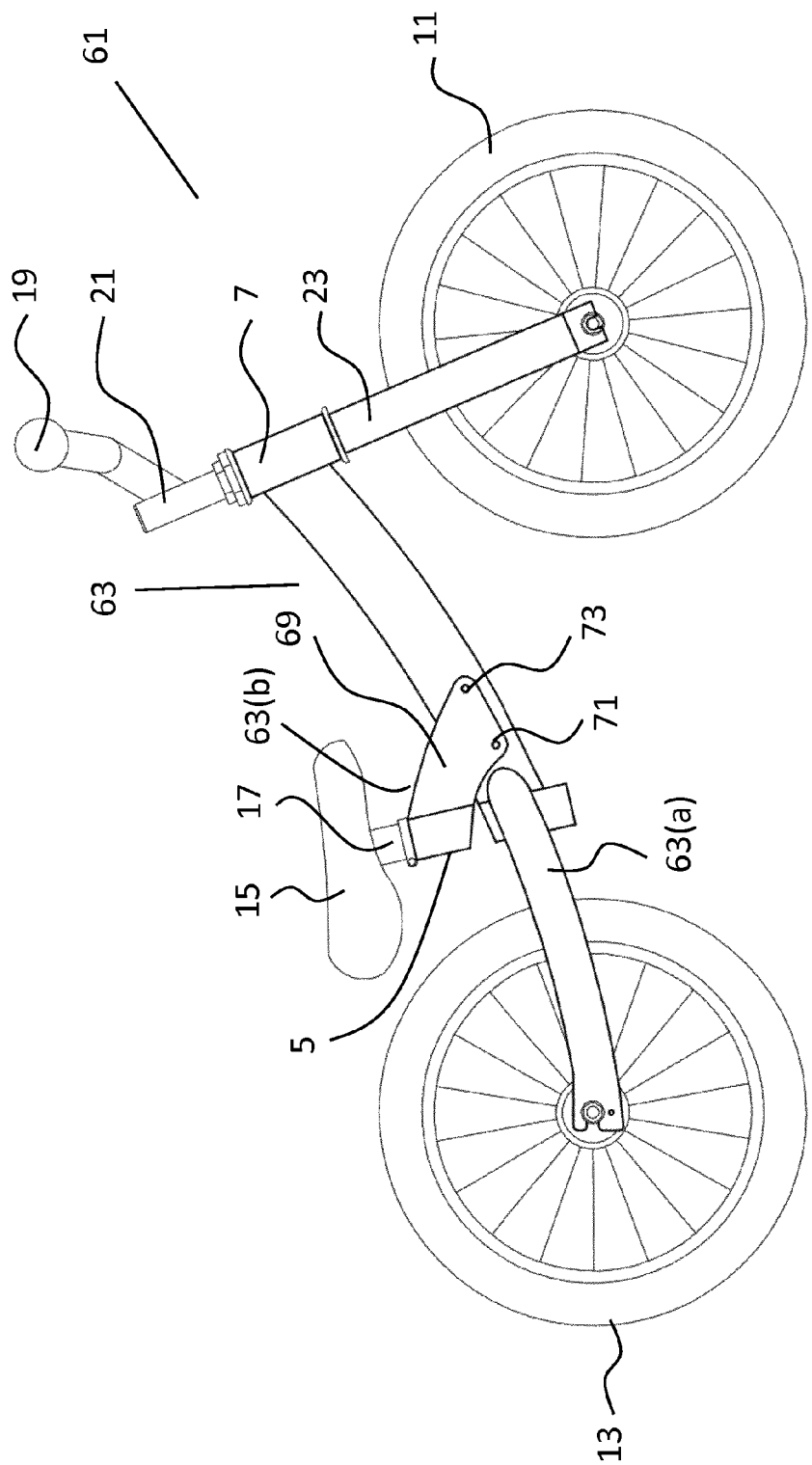
FIG. 3(b) is a side view of the bicycle shown in FIG. 3(a) in a lowered configuration without a drivetrain connected.
Figure 3C:
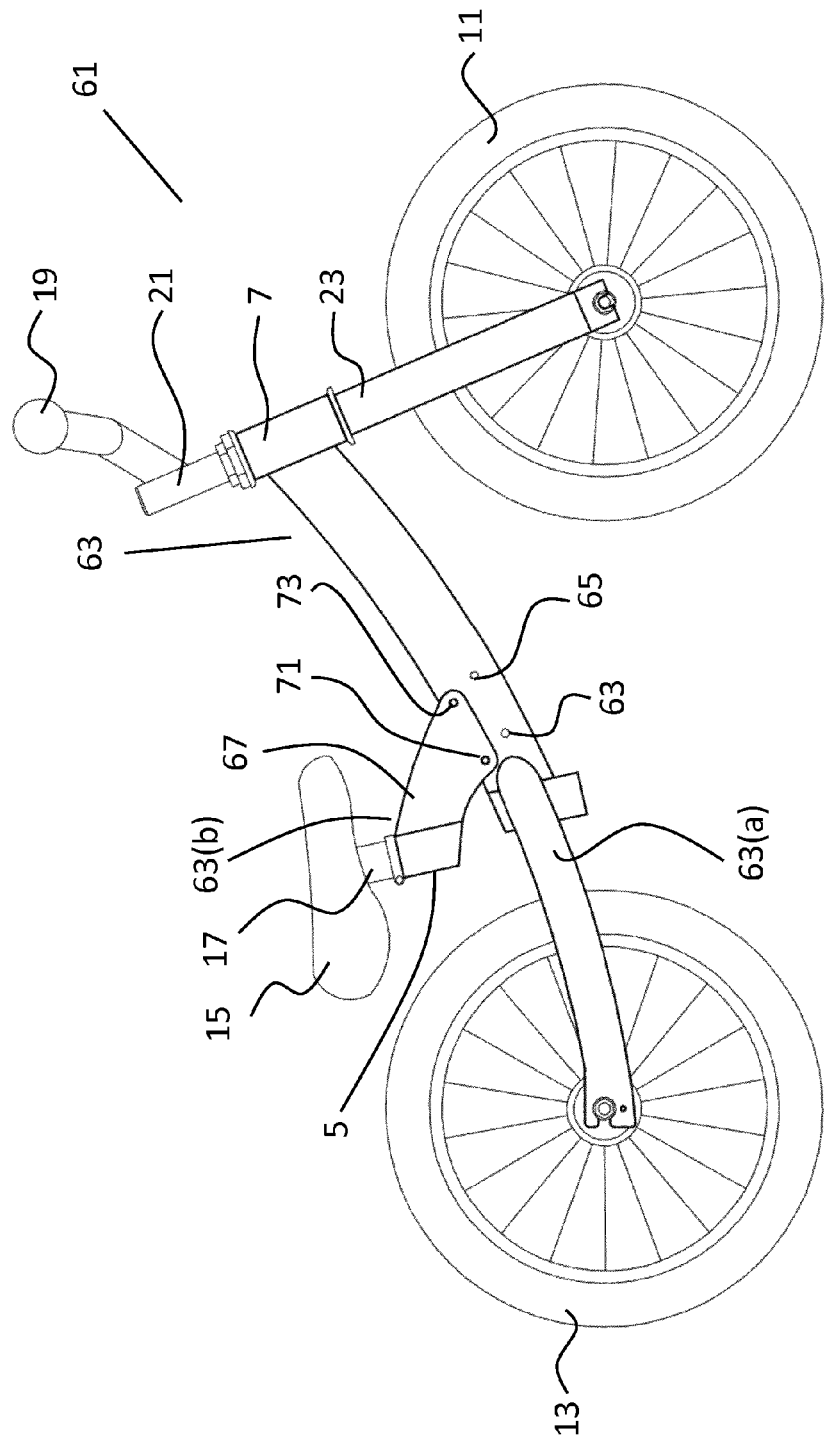
FIG. 3(c) is a side view of the bicycle shown in FIG. 3(a) in a raised configuration without a drivetrain connected.
Figure 3D:
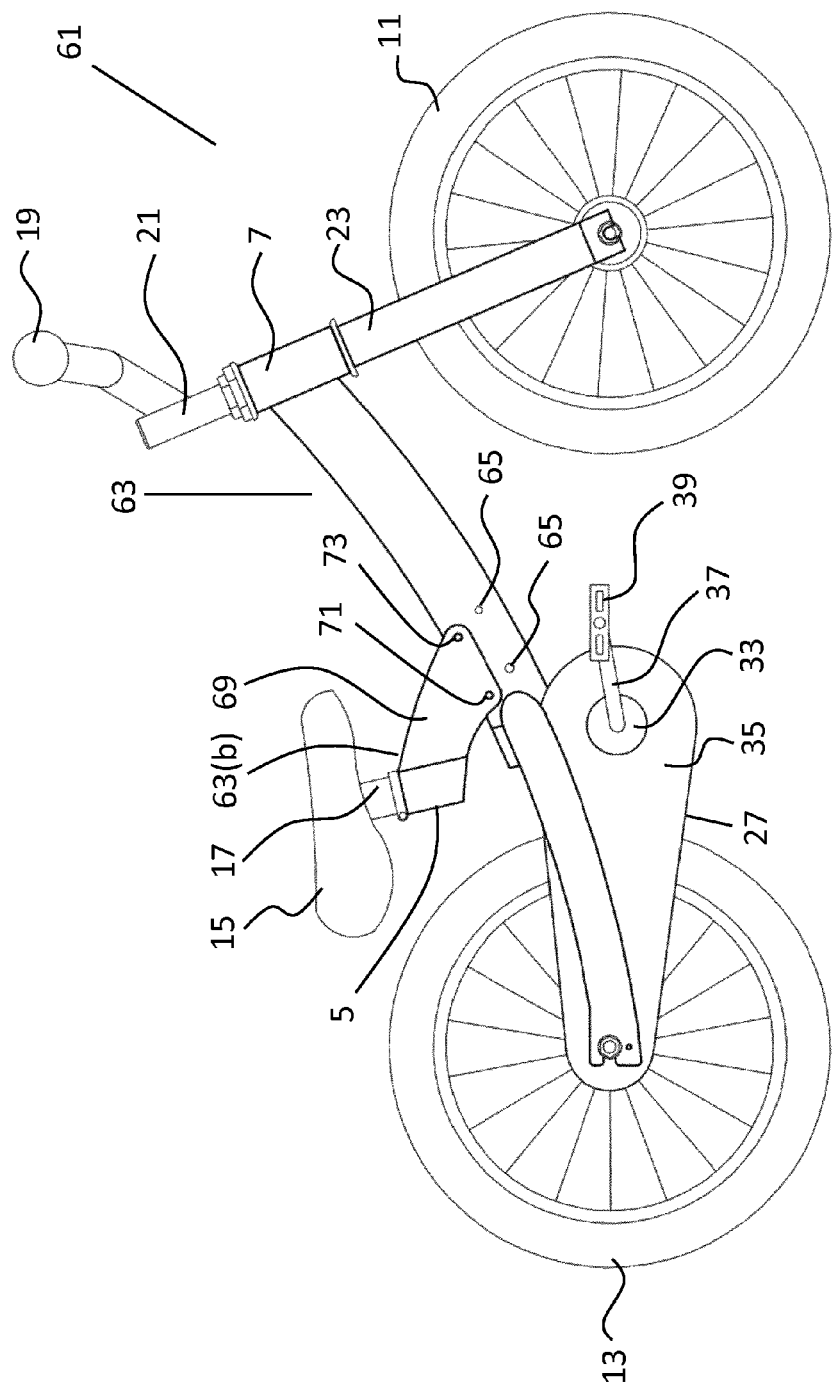
FIG. 3(d) is a side view of the bicycle shown in FIG. 3(a) in a raised configuration with a drivetrain connected.

In use, the parent chooses the appropriate mounting points to use depending on the height of the child and inserts locking bolts through the mounting apertures 71, 73 and through the chosen set of mounting points 65 or 67. The drivetrain 27 is mounted on the frame 63 if desired. Referring to FIG. 3(b), there is shown a side view of the bicycle in a lowered configuration without a drivetrain connected. In this instance, the locking bolts have been inserted though the mounting apertures 71, 73 and the lower set of mounting points 65. In order to raise the bicycle frame, the locking nuts on the locking bolts are released and the locking bolts are removed from the apertures 71, 73 and the mounting points 65. The auxiliary frame part 63(b) is moved upwards until the mounting apertures 71, 73 correspond to the position of the mounting points 67. Once in position, the locking bolts are re-inserted into the mounting apertures 71, 73 and are passed through the mounting points 67 before being secured in place with the locking nuts. In this position, the bicycle is in a raised configuration without a drivetrain connected as illustrated in FIG. 3(c). In FIG. 3(d), the bicycle is in a raised configuration with the drivetrain 27 connected.

Referring to FIGS. 4(a) to 4(d) inclusive, there is shown a plurality of views of a fourth embodiment of a bicycle for children, indicated generally by the reference numeral 81, where like parts have been given the same reference numeral as before. The fourth embodiment differs from the previous embodiments in that the frame 83 is a one piece frame on which the seat tube 5, the head tube 7, the chainstays 9, the front wheel 11, the rear wheel 13, the handlebars 19, the stem 21, the forks 23 and the drivetrain 27 are mounted. As with the embodiments described above, the seat tube 5 comprises a first part 5(a) that is upwardly extending and a second part 5(b) that is downwardly depending. The seat post 17 is inserted into the upwardly extending part 5(a) and secured in place in the upwardly extending part 5(a) by the seat clamp 25.

Figure 4A:
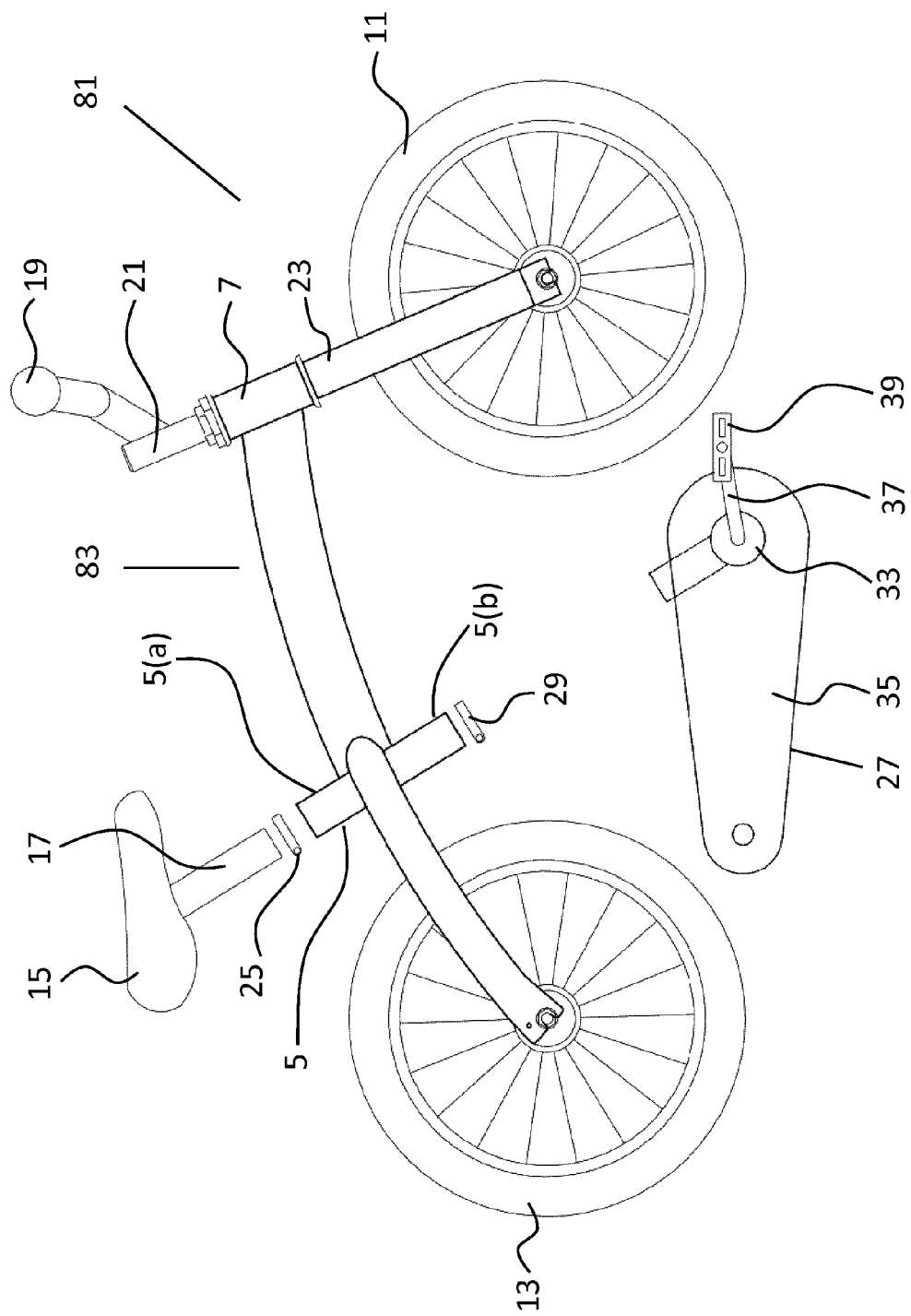
FIG. 4(a) is an exploded view of a fourth embodiment of bicycle according to the invention.
Figure 4B:
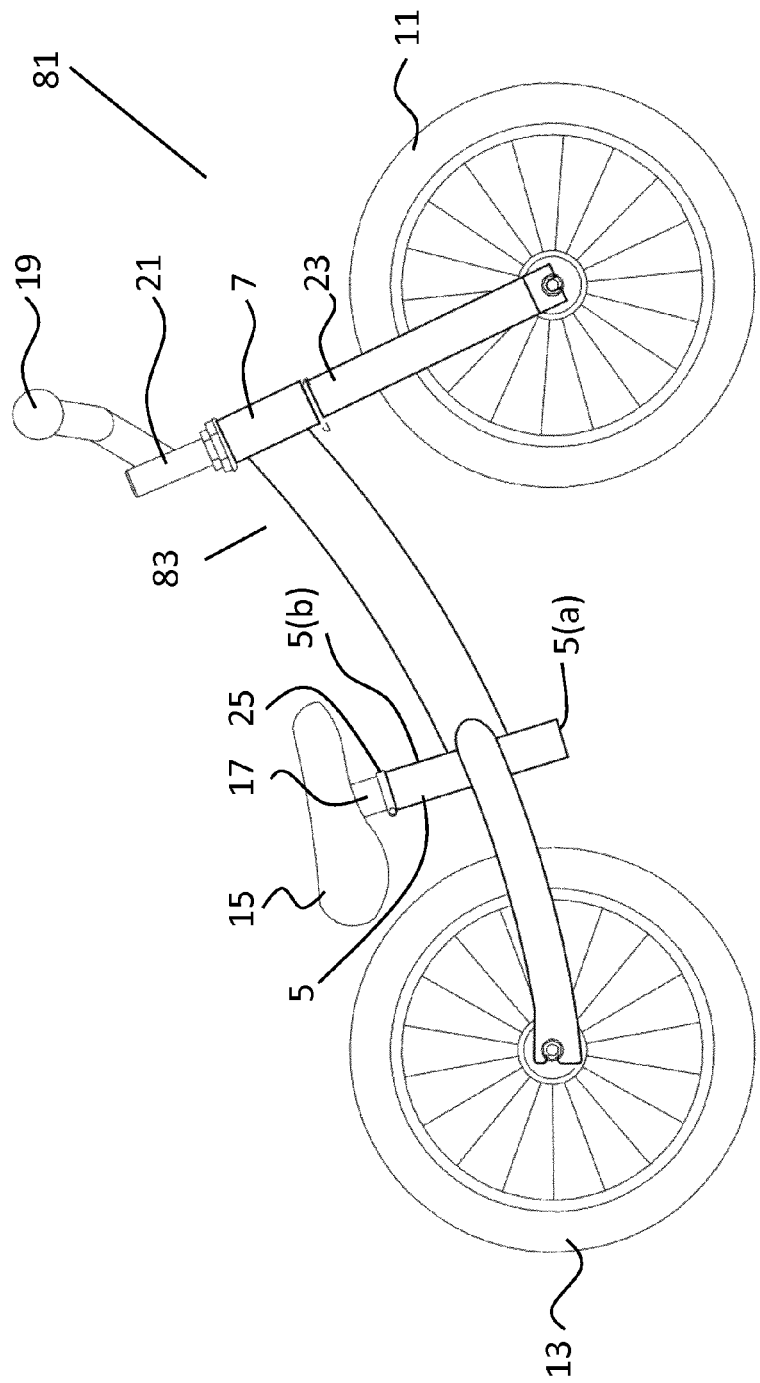
FIG. 4(b) is a side view of the bicycle shown in FIG. 4(a) in a lowered configuration without a drivetrain connected.

Referring specifically to FIG. 4(b), the bicycle for children is shown in a lowered, balance bicycle configuration without the drivetrain 27 attached to the frame 3. It can be seen that the one piece frame 83 has been rotated through 180° about a longitudinal axis compared to the configuration shown in FIG. 4(a). The second part 5(b) of the seat tube 5 that was the downwardly depending part in FIG. 4(a) is now the upwardly extending part in FIG. 4(b) and the first part 5(a) of the seat tube 5 that was the upwardly extending part in FIG. 4(a) is now the downwardly depending part in FIG. 4(b). The seat post 17 is inserted into the second part 5(b) of the seat tube 5 that is upwardly extending and secured in place with the clamp 25. It can be seen that in this configuration, the uppermost point of the seat tube 5 is relatively close to the ground and the saddle is relatively close to the handlebars and therefore the bicycle in this configuration is suitable for children that are diminutive in stature. If desired, if the child is ready for a pedal bicycle, a drivetrain may be mounted on the frame, as will be described in more detail below with reference to FIG. 4(d).

Figure 4C:
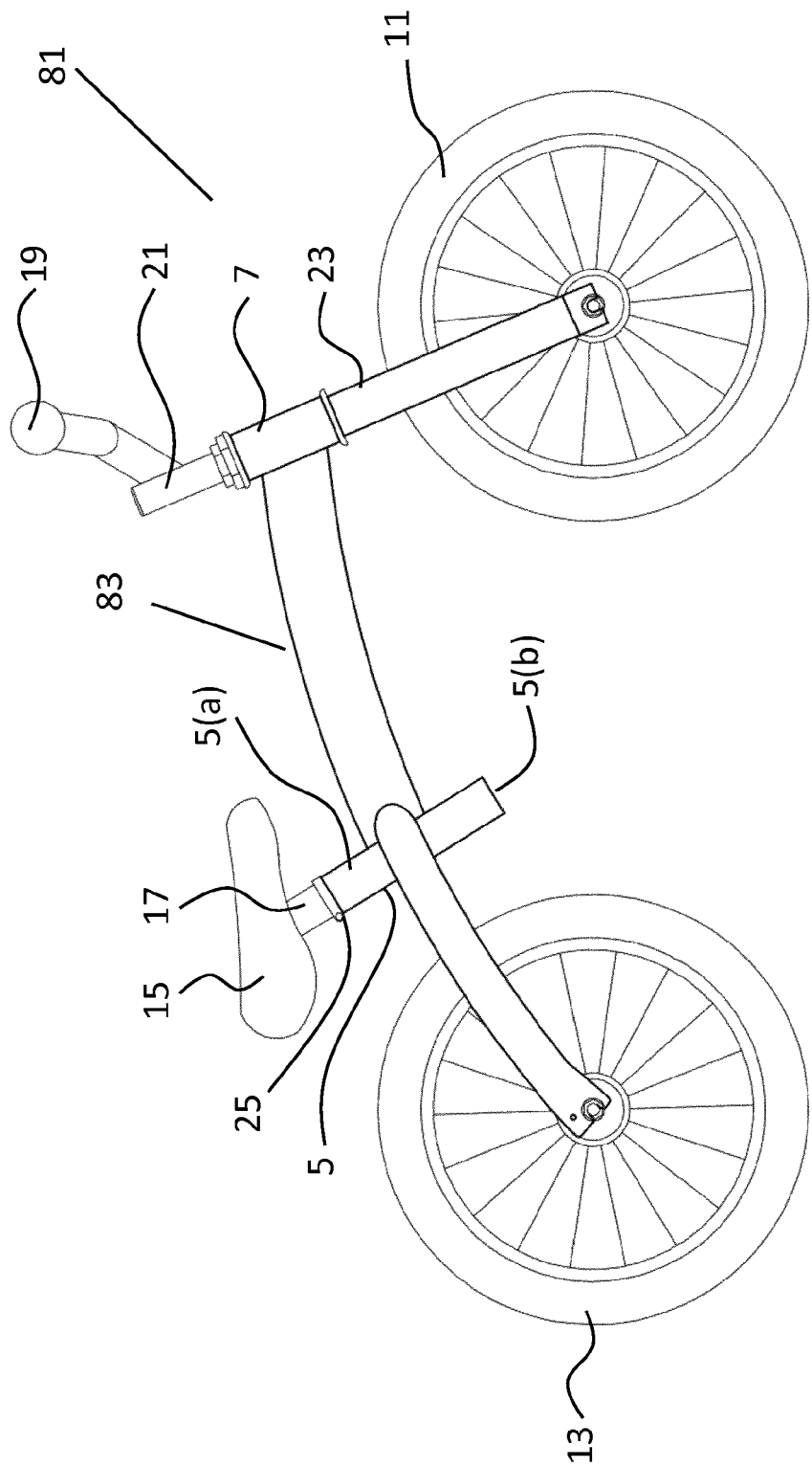
FIG. 4(c) is a side view of the bicycle shown in FIG. 4(a) in a raised configuration without a drivetrain connected.

Referring to FIG. 4(c), the bicycle is shown in a raised, balance bicycle configuration without the drivetrain 27 attached to the frame 3. The frame of the balance bicycle may be raised compared to the configuration shown in FIG. 4(b) by: disconnecting the handlebars 19, the stem 21 and the forks 23 including the front wheel 11 from the frame 83; disconnecting the seat clamp 25 and removing the seat post 17 from the upwardly extending second part 5(b) of the seat tube; rotating the entire frame 83 through 180° about its longitudinal axis; re-connecting the handlebars 19, the stem 21 and the forks 23 including the front wheel 11 to the frame 83; and inserting the seat post 17 into the now upwardly extending first part 5(a) of the seat tube 5 before securing it in position with the seat clamp. It can be seen that in this configuration shown in FIG. 4(c), the uppermost point of the seat tube 5 has moved away from the ground and the saddle has moved further from the handlebars relative to the configuration shown in FIG. 4(b) and therefore the bicycle in this configuration is suitable for relatively tall children.

Figure 4D:
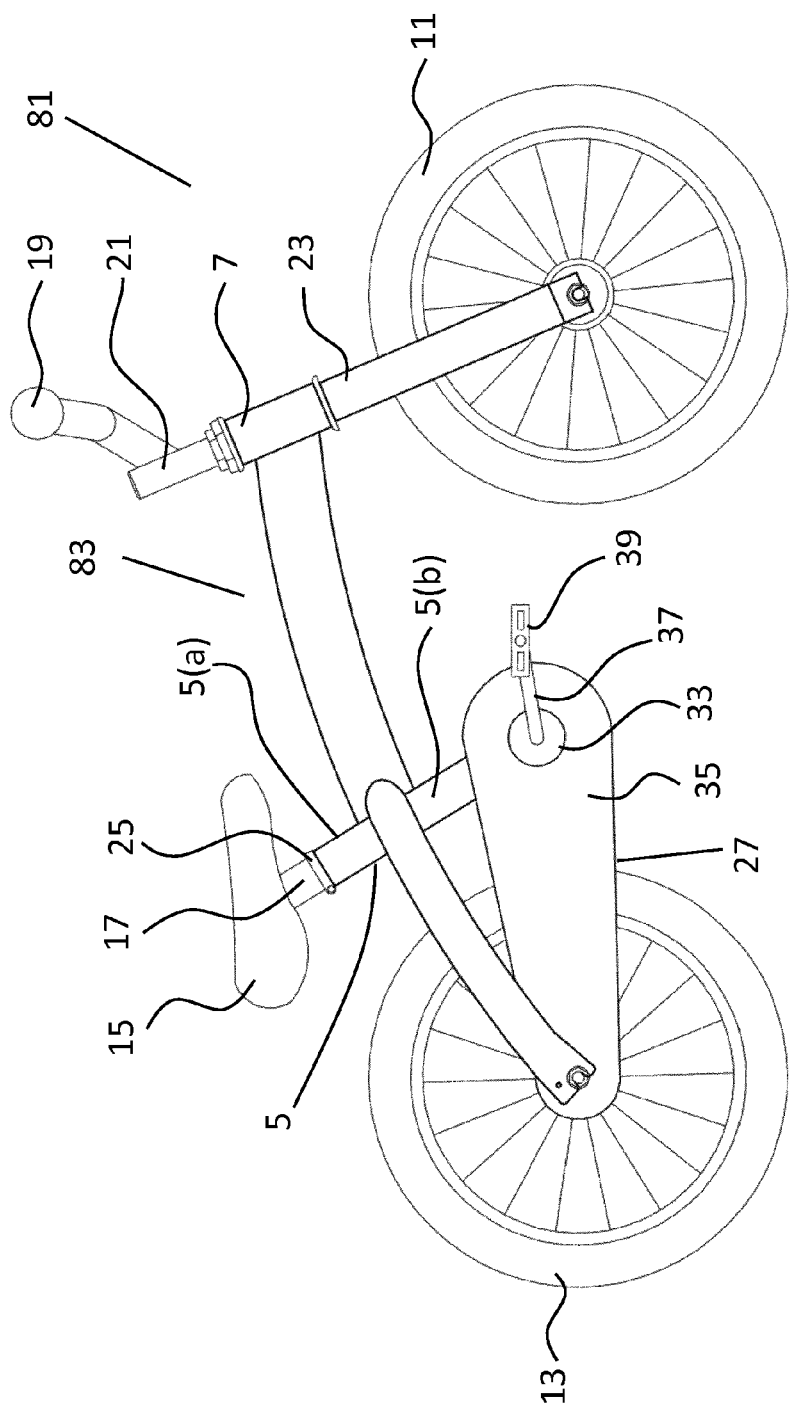
FIG. 4(d) is a side view of the bicycle shown in FIG. 4(a) in a raised configuration with a drivetrain connected.

Referring to FIG. 4(d), the bicycle is shown in a raised, pedal bicycle configuration with the drivetrain 27 attached to the frame 83. In order to attach the drivetrain 27 to the frame 83, the mounting stub 31 is inserted into the downwardly depending part 5(b) of the seat tube 5 and a sprocket (not shown) is connected to the rear wheel 13. As will be understood from the foregoing, the drivetrain can be connected to the frame 83 when the frame is in a lowered configuration such as that shown in FIG. 4(b).

Referring to FIGS. 5(a) to 5(d) inclusive, there is shown a plurality of views of a fifth embodiment of a bicycle for children, indicated generally by the reference numeral 91, where like parts have been given the same reference numeral as before. The bicycle 91 is highly similar to the embodiment described with reference to FIGS. 1(a) to 1(d) above and comprises a two part frame 93 consisting of a front frame part 93(a) and a rear frame part 93(b) releasably connectable to the front frame part 93(a).

Figure 5A:
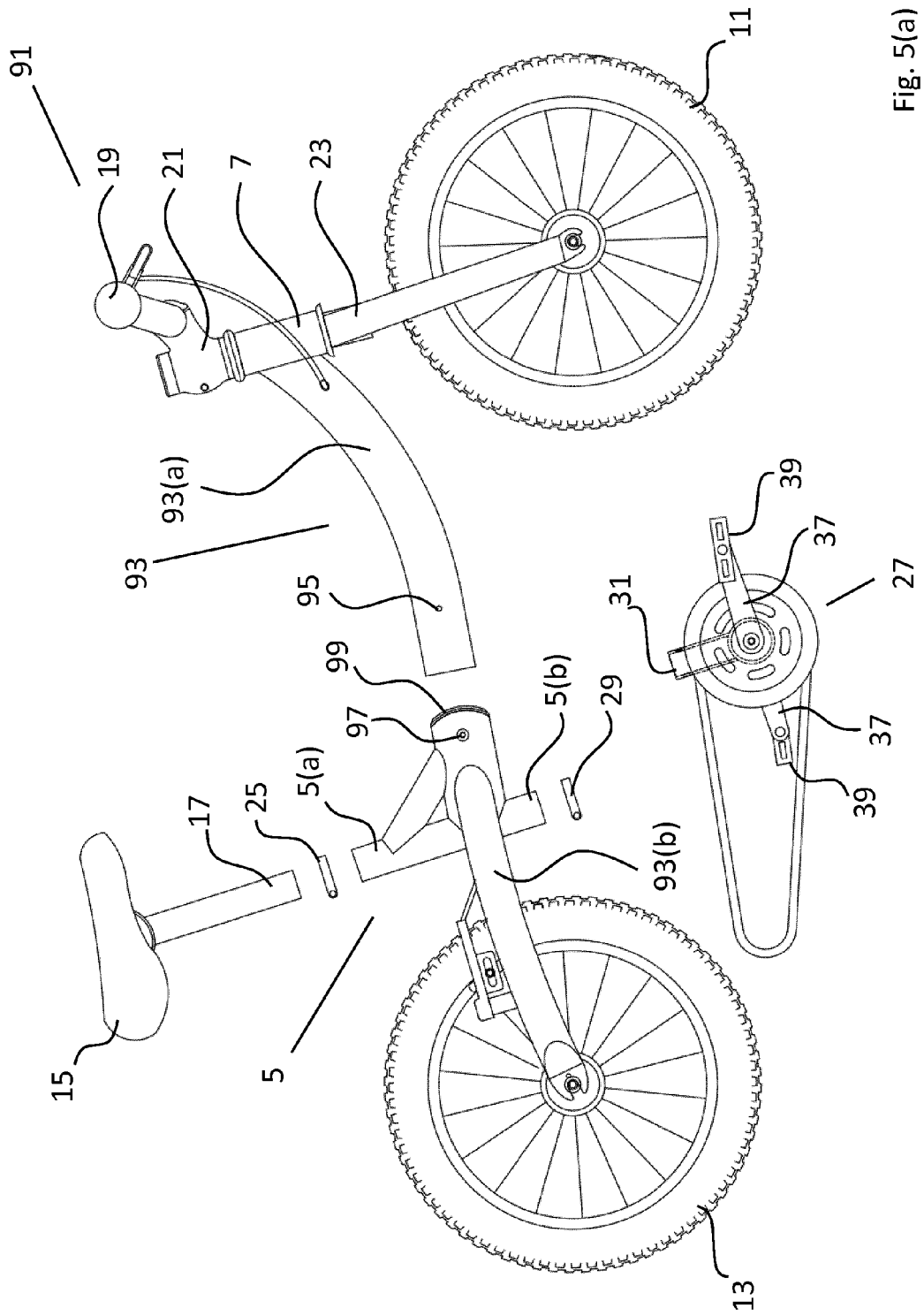
FIG. 5(a) is an exploded view of a fifth embodiment of bicycle according to the invention.

Referring specifically to FIG. 5(a), it can be seen that the front frame part 93(a) comprises the head tube 7 and a rear frame part 93(b) comprises the pair of chainstays 9. The rear frame part 93(b) has an internal bore (not shown) and the front frame part 93(a) is dimensioned to extend inwardly and be partially housed in the internal bore of the rear frame part 93(b). There is provided a thoughhole 95 in the front frame part 93(a) and a corresponding throughhole 97 in the rear frame part 93(b). When the front frame part 93(a) is inserted into the internal bore in the rear frame part 93(b), the throughholes 95 and 97 allign with each other so that a bolt (not shown) or other locking member can be inserted therethrough to secure the front frame part 93(a) and the rear frame part 93(b) in fixed relationship with each other. Instead of having a single throughbolt to secure the front frame part and the rear frame part together, a pair of separate bolts (not shown) that screw into the frame 93 could be provided.

Preferably, the portion of the front frame part 93(a) that may be inserted into the rear frame part 93(b) and the internal bore of the rear frame part 93(b) are circular so that when they are not held in fixed position relative to each other with locking bolts, the two sections are free to rotate relative to each other. Alternatively, the portion of the front frame part that may be inserted into the rear frame part and the internal bore of the rear frame part may be dimensioned to prevent rotation of the front and rear frame parts 93(a), 93(b) relative to each other when the front frame part 93(a) is inserted into the bore of the rear frame part 93(b). For example, both the portion of the front frame part 93(a) insertable into the internal bore of the rear frame part 93(b) and the internal bore of the rear frame part 93(b) may be elliptical, square, rectangular, hexagonal, octagonal or like shape in cross section and form a close fit with each other to prevent rotation of the front frame part 93(a) relative to the rear frame part 93(b). In the embodiment shown, there is provided a plastic insert 99 inserted into the bore of the rear frame part 93(b) for location intermediate and acting as a buffer between the front frame part 93(a) and the rear frame part 93(b). It can be further seen that both the front frame part 93(a) and rear frame part 93(b) are arcuate in shape along a longitudinal direction of the frame parts.

Figure 5B:
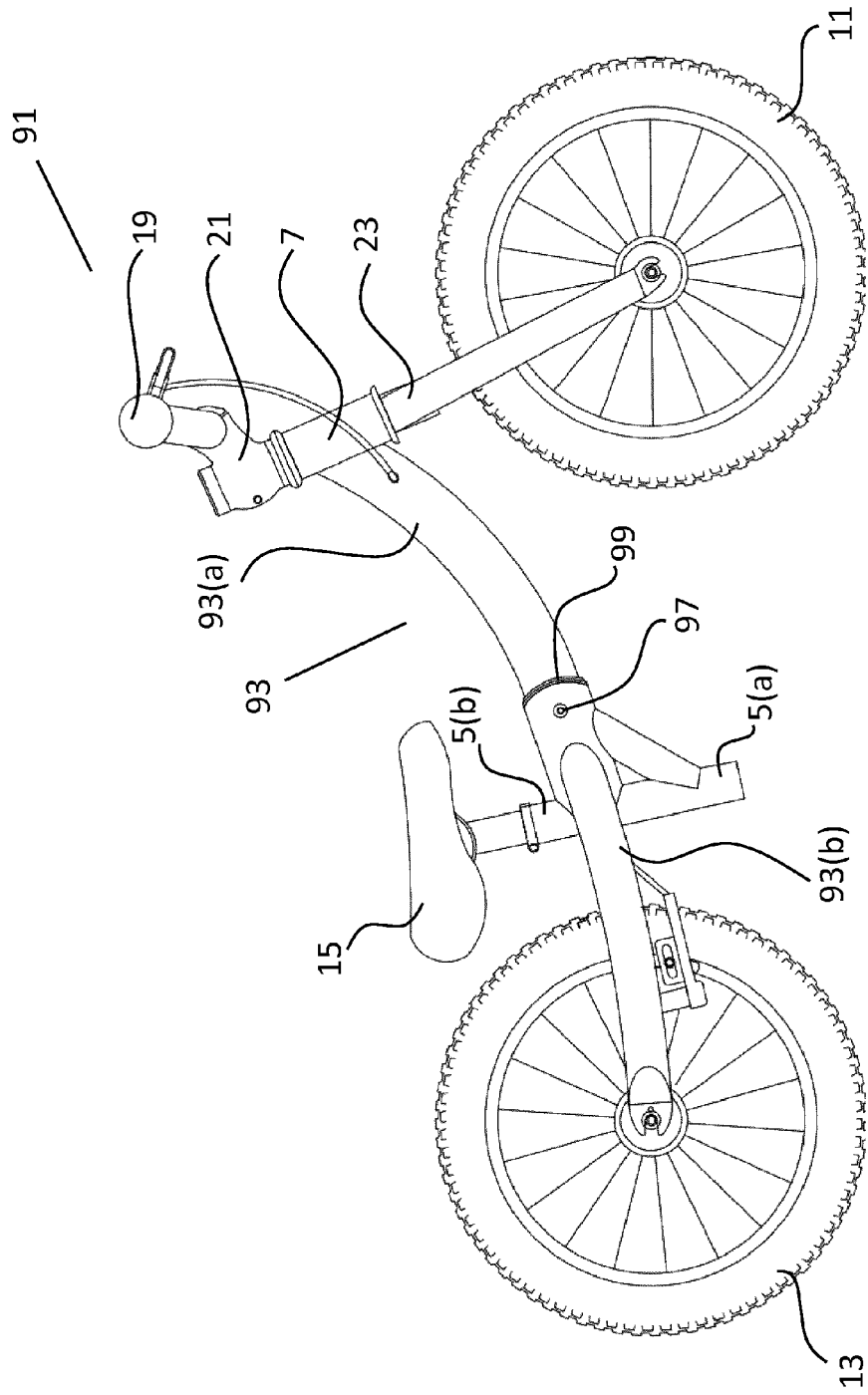
FIG. 5(b) is a side view of the bicycle shown in FIG. 5(a) in a lowered configuration without a drivetrain connected.

Referring specifically to FIG. 5(b), the bicycle 91 for children is shown in a lowered, balance bicycle configuration without the drivetrain 27 attached to the frame 93. It can be seen that the rear frame section 93(b) has been rotated through 180° about a longitudinal axis compared to the configuration shown in FIG. 5(a) and that portion of the front frame part 93(a) has been inserted into the internal bore of the rear frame part 93(b). The second part 5(b) of the seat tube 5 that was the downwardly depending part in FIG. 5(a) is now the upwardly extending part in FIG. 5(b) and the first part 5(a) of the seat tube 5 that was the upwardly extending part in FIG. 5(a) is now the downwardly depending part in FIG. 5(b). The seat post 17 is inserted into the second part 5(b) of the seat tube 5 that is upwardly extending and secured in place with the clamp 25. It can be seen that in this configuration, the uppermost point of the seat tube 5 is relatively close to the ground and the handlebars are relatively close to the saddle and therefore the bicycle in this configuration is suitable to relatively short children. If desired, if the child is ready for a pedal bicycle, a drivetrain (not shown) may be mounted on the frame, as will be described in more detail below with reference to FIG. 5(d).

Figure 5C:
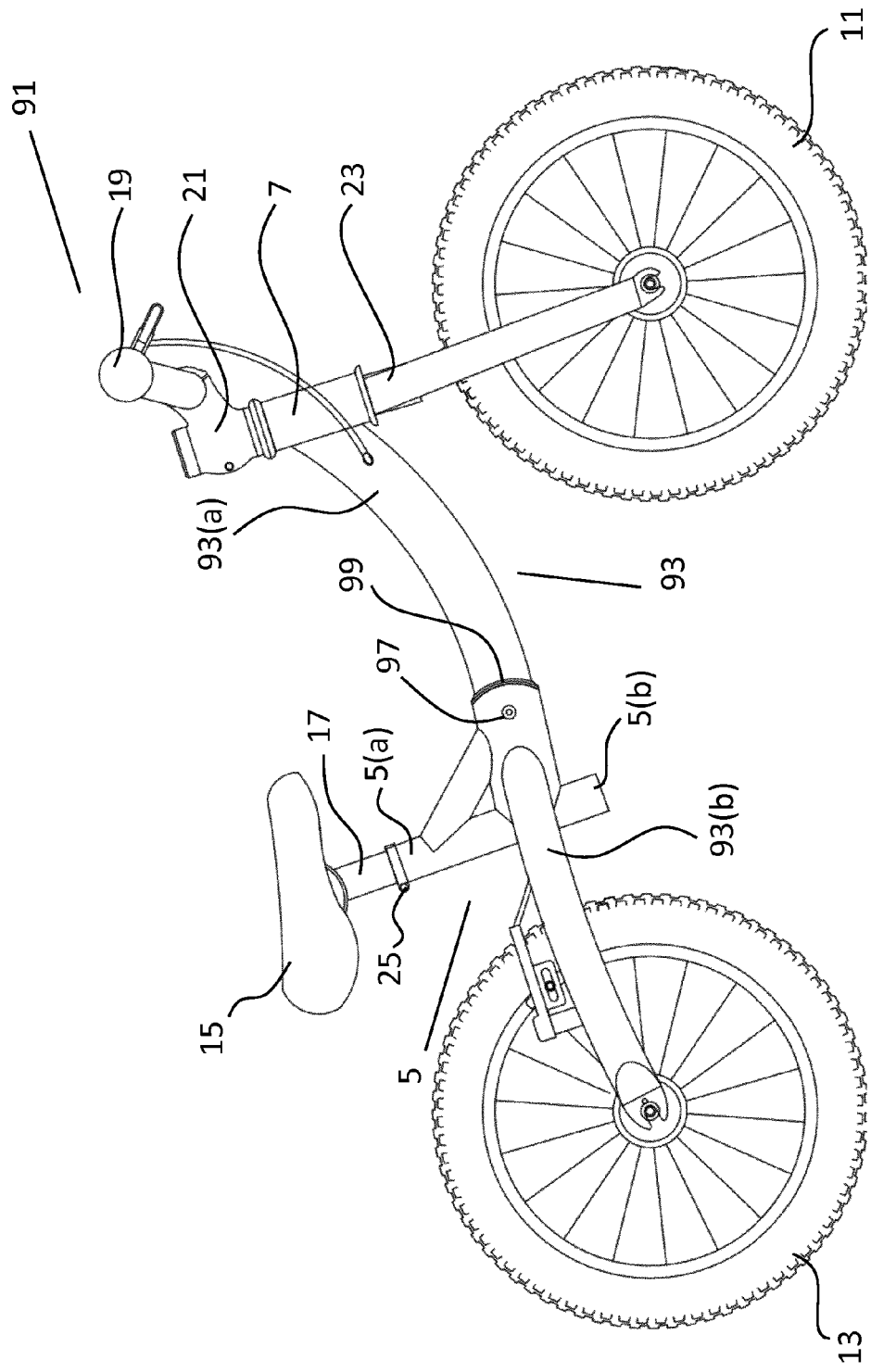
FIG. 5(c) is a side view of the bicycle shown in FIG. 5(a) in a raised configuration without a drivetrain connected.

Referring to FIG. 5(c), the bicycle is shown in a raised, balance bicycle configuration without the drivetrain 27 attached to the frame 93. As the child grows, they may require a taller bicycle frame even though they may not yet be ready for pedals. In order to achieve this, the frame of the balance bicycle may be raised compared to the configuration shown in FIG. 5(b) by: (i) disconnecting the rear frame section 93(b) from the front frame section 93(a) by unscrewing a locking nut (not shown) and removing the locking bolt (not shown) that has been inserted through the throughholes 95, 97, before sliding the front and rear frame sections 93(a), 93(b) apart; (ii) rotating the rear frame section 93(b) through 180° about its longitudinal axis before re-inserting the part on the front frame section 93(a) into the internal bore in the rear frame section 93(b); (iii) securing the front frame section 93(a) to the rear frame section 93(b) by inserting the locking bolt (not shown) through the throughholes 95, 97 in the front and rear frame parts 93(a), 93(b) and securing the locking bolt in position with a locking nut (not shown); and (iv) repositioning the seat 15 by releasing the seat clamp 25 and removing the seat post 17 from the second part 5(b) of the seat tube before inserting the seat post 17 into the first part 5(a) of the seat tube and securing the seat in position with the seat clamp 25.

Again, as with the embodiment described with reference to FIGS. 1(a) to 1(d) inclusive, if the part of the front frame section 93(a) that is inserted into the internal bore of the rear frame section 93(b) and the internal bore are circular in cross-section, it will be understood that the rear frame section will not have to be detached from the front frame section. Instead, the locking bolt(s) securing the front and rear frame sections together can be temporarily released, the rear frame section 93(b) can be rotated through 180° about its longitudinal axis and the front and rear frame sections can be fastened together once more with the locking bolt and locking nut. This is achieved without the separation of the two frame sections from each other.

It can be seen that in this configuration shown in FIG. 5(c), the uppermost point of the seat tube 5 has moved away from the ground and the saddle has moved away from the handlebars, thereby increasing the height and the reach of the frame, and therefore the bicycle in this configuration is suitable for relatively tall children.

Figure 5D:
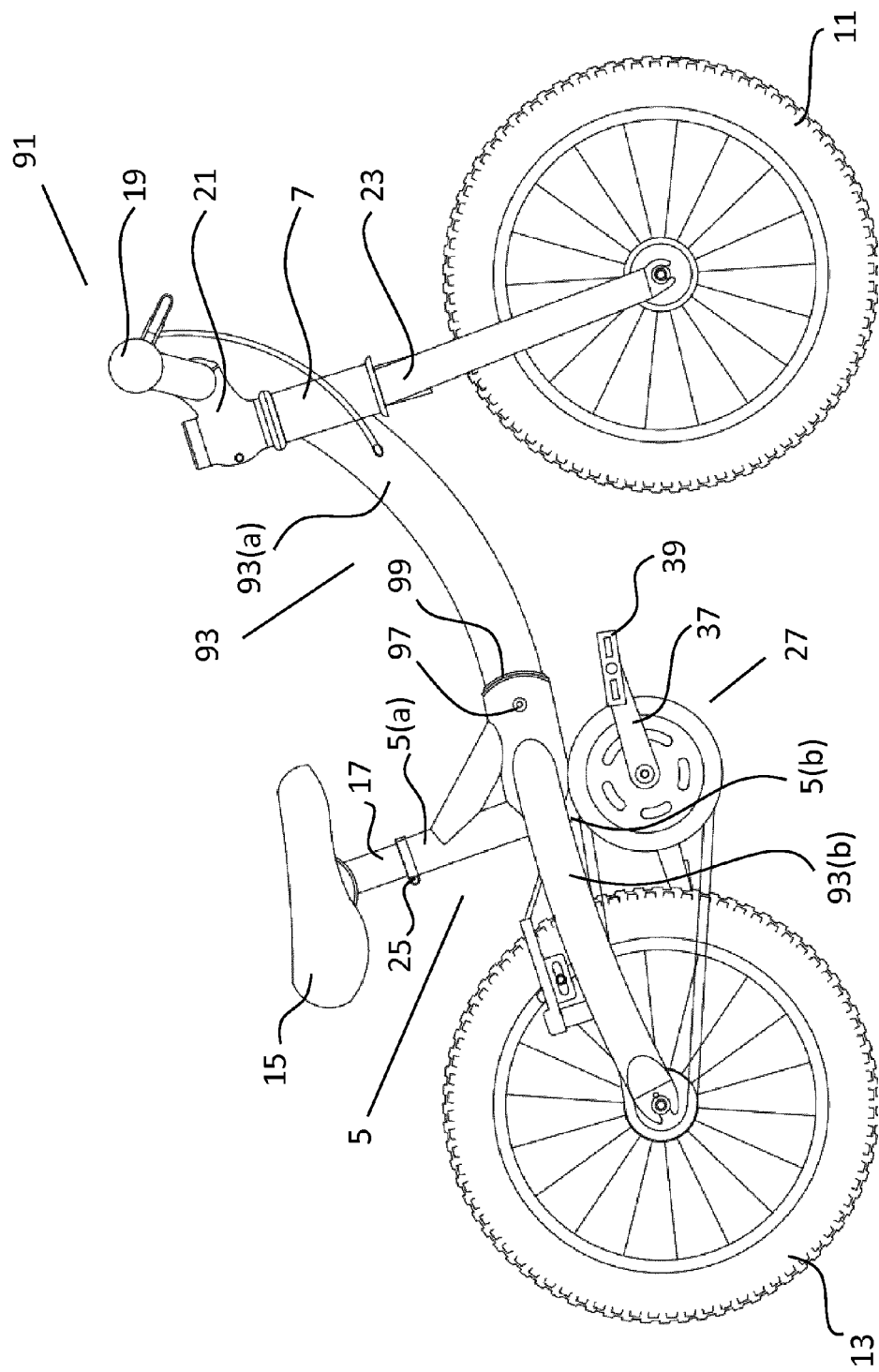
FIG. 5(d) is a side view of the bicycle shown in FIG. 5(a) in a raised configuration with a drivetrain connected.

Referring to FIG. 5(d), the bicycle is shown in a raised, pedal bicycle configuration with the drivetrain 27 attached to the frame 93. In order to attach the drivetrain 27 to the frame 93, the mounting stub 31 is inserted into the downwardly depending part 5(b) of the seat tube 5 and a sprocket (not shown) is connected to the wheel hub (not shown) so that the drive train 27 is coupled to the rear wheel 13. In the embodiment shown in FIG. 5(d), the saddle 15 is shown in a raised configuration, thereby providing further height adjustment to the bicycle so that it can "grow" with the child.

It will be understood that various modifications could be made to the embodiments described without departing from the spirit of the invention.

In this specification the terms "comprise, comprises, comprised and comprising" and the terms "include, includes, included and including" are all deemed totally interchangeable and should be afforded the widest possible interpretation.

The invention is in no way limited to the embodiments hereinbefore described and may be varied in both construction and detail within the scope of the claims.

The invention claimed is:

1. A bicycle comprising a frame having a seat-tube, the frame having mounted thereon a front wheel, a rear wheel, a pair of handlebars coupled to the front wheel through a front fork, and a saddle having a seat-post for insertion into the seat-tube, and in which there is provided a detachably mounted drivetrain for releasable engagement of the frame to allow conversion of the bike to and from a balance bicycle and a pedal bicycle, and in which the bicycle frame itself is configurable to provide a frame that is height-adjustable to allow alteration of the height of the seat tube above the ground and reach-adjustable to allow alteration of the distance between the saddle and the handlebars, and in which the frame comprises a two part frame, a first part and a second part, and in which the second part is adjustably mounted on the first part to allow alteration of the height of the seat tube above the ground and alteration of the distance between the saddle and the handlebars, and in which the first part comprises a front frame part having a head tube and the second part comprises a rear frame part having a pair of chainstays and the seat-tube, and in which the rear frame part is rotatable relative to the front frame part.

2. The bicycle as claimed in claim 1 in which one of the front and rear frame parts is provided with an internal bore and the other of the front and rear frame parts is provided with an axial extension for insertion into the internal bore of the other frame part.

3. The bicycle as claimed in claim 2 in which the internal bore and the axial extension are dimensioned to prevent rotation of the axial extension when it is housed in the internal bore.

4. The bicycle as claimed in claim 3 in which the frame is cranked intermediate its ends and is reversible so that it may be flipped about its main longitudinal axis.

5. The bicycle as claimed in claim 2 in which the frame is cranked intermediate its ends and is reversible so that it may be flipped about its main longitudinal axis.

6. A bicycle comprising a frame having a seat-tube, the frame having mounted thereon a front wheel, a rear wheel, a pair of handlebars coupled to the front wheel through a front fork, and a saddle having a seat-post for insertion into the seat-tube, and in which there is provided a detachably mounted drivetrain for releasable engagement of the frame to allow conversion of the bike to and from a balance bicycle and a pedal bicycle, and in which the bicycle frame itself is configurable to provide a frame that is height-adjustable to allow alteration of the height of the seat tube above the ground and reach-adjustable to allow alteration of the distance between the saddle and the handlebars, and in which the frame comprises a two part frame, a first part and a second part, and in which the second part is adjustably mounted on the first part to allow alteration of the height of the seat tube above the ground and alteration of the distance between the saddle and the handlebars, and in which the first part comprises a front frame part having a head tube and the second part comprises a rear frame part having a pair of chainstays and the seat-tube, and in which the rear frame part is pivotably mounted on the front frame part.

7. A bicycle comprising a frame having a seat-tube, the frame having mounted thereon a front wheel, a rear wheel, a pair of handlebars coupled to the front wheel through a front fork, and a saddle having a seat-post for insertion into the seat-tube, and in which there is provided a detachably mounted drivetrain for releasable engagement of the frame to allow conversion of the bike to and from a balance bicycle and a pedal bicycle, and in which the bicycle frame itself is configurable to provide a frame that is height-adjustable to allow alteration of the height of the seat tube above the ground and reach-adjustable to allow alteration of the distance between the saddle and the handlebars, and in which the frame comprises a two part frame, a first part and a second part, and in which the second part is adjustably mounted on the first part to allow alteration of the height of the seat tube above the ground and alteration of the distance between the saddle and the handlebars, and in which the first part comprises a head tube at a front end thereof and extends rearwardly therefrom into a pair of chainstays, and in which the second part comprises a seat-tube mounted on a bracket which is detachably mounted on the first part in any one of a plurality of mounting points on the first part.

8. A bicycle comprising a frame having a seat-tube, the frame having mounted thereon a front wheel, a rear wheel, a pair of handlebars coupled to the front wheel through a front fork, and a saddle having a seat-post for insertion into the seat-tube, and in which there is provided a detachably mounted drivetrain for releasable engagement of the frame to allow conversion of the bike to and from a balance bicycle and a pedal bicycle, and in which the bicycle frame itself is configurable to provide a frame that is height-adjustable to allow alteration of the height of the seat tube above the ground and reach-adjustable to allow alteration of the distance between the saddle and the handlebars, and in which the frame is cranked intermediate its ends and is reversible so that it may be flipped about its main longitudinal axis.

9. The bicycle as claimed in claim 8 in which the frame is arcuate in shape.

10. The bicycle as claimed in claim 9 in which the front wheel is mounted between a pair of forks, and in which the forks and the handlebars are detachably mounted to the frame and their positions are interchangeable on the frame.

11. The bicycle as claimed in claim 8 in which the front wheel is mounted between a pair of forks, and in which the forks and the handlebars are detachably mounted to the frame and their positions are interchangeable on the frame.

12. The bicycle as claimed in claim 11 in which the pair of forks are connected to the handlebars by way of a stem which passes through a head tube on the frame, and in which one of the handlebars and the pair of forks are detachably mounted to the stem to allow removal of the stem from the head tube and reversal of the positions of the handlebars and the forks relative to the frame.

13. The bicycle as claimed in claims 8 in which the front wheel is mounted between a pair of forks which are connected to the handlebars by way of a stem which passes through a head tube on the frame, and in which the head tube is rotatably mounted on the frame.

14. A bicycle comprising a frame having a seat-tube, the frame having mounted thereon a front wheel, a rear wheel, a pair of handlebars coupled to the front wheel through a front fork, and a saddle having a seat-post for insertion into the seat-tube, and in which there is provided a detachably mounted drivetrain for releasable engagement of the frame to allow conversion of the bike to and from a balance bicycle and a pedal bicycle, and in which the bicycle frame itself is configurable to provide a frame that is height-adjustable to allow alteration of the height of the seat tube above the ground and reach-adjustable to allow alteration of the distance between the saddle and the handlebars and in which the frame is cranked intermediate its ends and is reversible so that it may be flipped about its main longitudinal axis.

* * * * *